(12) United States Patent
Oiwa

(10) Patent No.: US 11,029,901 B2
(45) Date of Patent: Jun. 8, 2021

(54) INFORMATION PROCESSING APPARATUS, SYSTEM, DISPLAY METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventor: Yasuyuki Oiwa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/456,164

(22) Filed: Jun. 28, 2019

(65) Prior Publication Data

US 2020/0012465 A1 Jan. 9, 2020

(30) Foreign Application Priority Data

Jul. 6, 2018 (JP) .............................. JP2018-129466

(51) Int. Cl.
*G06F 3/12* (2006.01)
*G06F 3/0483* (2013.01)

(52) U.S. Cl.
CPC .......... *G06F 3/1256* (2013.01); *G06F 3/0483* (2013.01); *G06F 3/1208* (2013.01); *G06F 3/1255* (2013.01); *G06F 3/1258* (2013.01)

(58) Field of Classification Search
CPC .... G06F 3/1256; G06F 3/0483; G06F 3/1208; G06F 3/1255; G06F 3/1258
USPC .................... 358/1.14, 1.13, 1.9, 1.15, 537
See application file for complete search history.

(56) References Cited

U.S. PATENT DOCUMENTS

| 9,519,624 | B1* | 12/2016 | Genoni | G06F 3/0483 |
| 2011/0141506 | A1* | 6/2011 | Sato | G06F 3/1208 |
| | | | | 358/1.12 |
| 2011/0205594 | A1* | 8/2011 | Chida | G06F 3/1208 |
| | | | | 358/1.18 |

FOREIGN PATENT DOCUMENTS

| JP | 2009-176286 A | 8/2009 |
| JP | 4771491 B2 | 9/2011 |

* cited by examiner

*Primary Examiner* — Quang N Vo
(74) *Attorney, Agent, or Firm* — Venable LLP

(57) ABSTRACT

An information processing apparatus comprises: a first display unit configured to display a preview screen including a preview image based on page data included in book data; a setting unit configured to set a spread attribute for laying out one page data included in the book data over a plurality of pages; and a display unit configured to display, if the page data set with the spread attribute does not satisfy a spread condition, information indicating that the spread condition is not satisfied in association with a preview image based on the page data set with the spread attribute together with the preview image based on the page data set with the spread attribute.

20 Claims, 17 Drawing Sheets

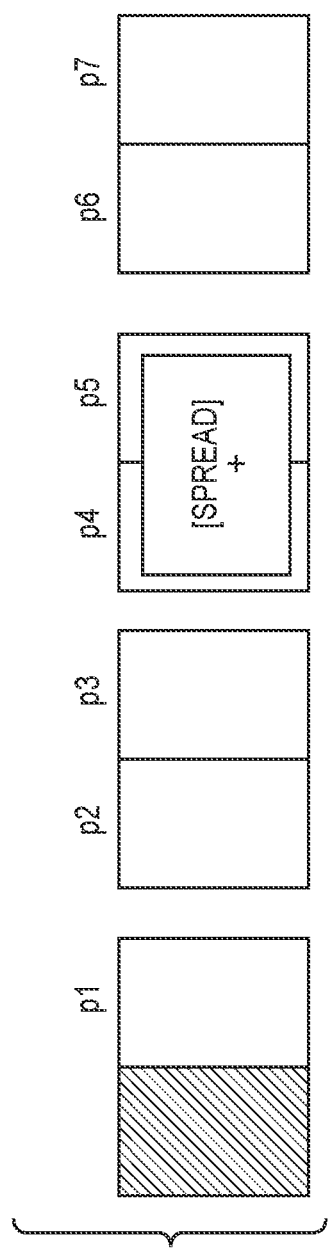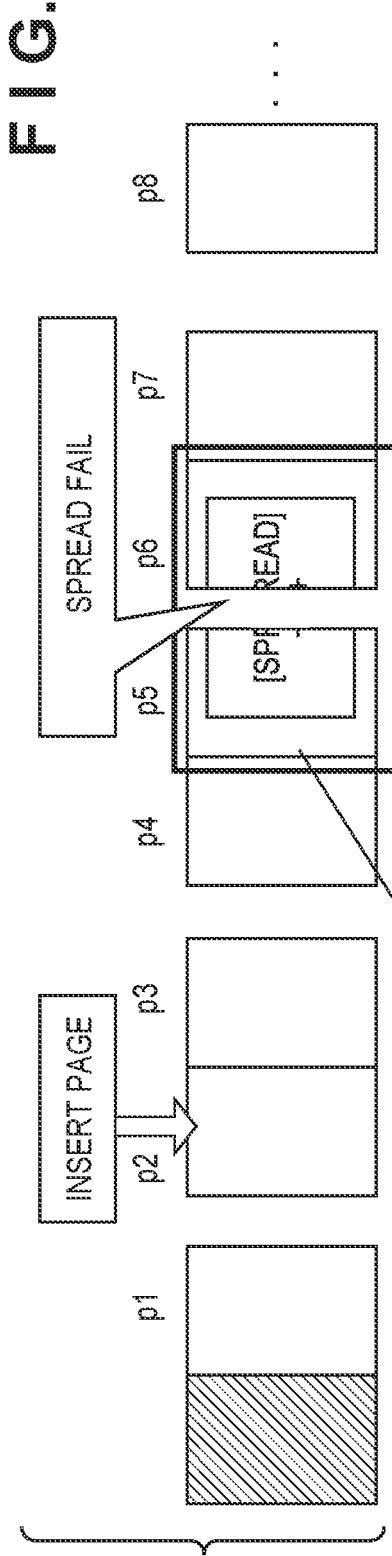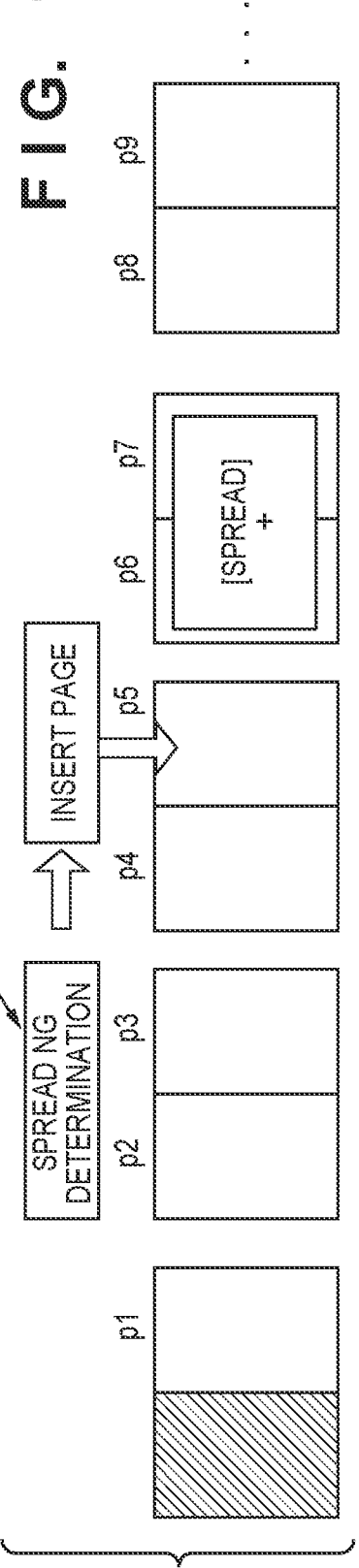

INFORMATION PROCESSING APPARATUS, SYSTEM, DISPLAY METHOD, AND NON-TRANSITORY COMPUTER-READABLE STORAGE MEDIUM STORING PROGRAM

BACKGROUND OF THE INVENTION

Field of the Invention

The present invention relates to an information processing apparatus capable of creating book data, a system, a display method, and a non-transitory computer-readable storage medium storing a program.

Description of the Related Art

There has conventionally been known a technique of performing bookbinding such as stapling or the like by allocating image data to each page. Japanese Patent No. 4771491 describes print processing of executing bookbinding printing based on a plurality of contents. Japanese Patent No. 4771491 also describes a technique of determining, in accordance with a content sheet size, whether content data is to be laid out in a double-page spread.

According to Japanese Patent No. 4771491, if it is determined that content data is not to be laid out in a double-page spread, a warning that intended printing may not be executed is displayed. Referring to FIG. 18 in Japanese Patent No. 4771491, a warning is displayed for a content that may not undergo intended printing.

However, if a spread fails when page data is allocated to be printed on the front and back surfaces of one sheet, even if a warning is simply displayed on a list of contents, it is difficult to intuitively grasp pages where the spread fails.

SUMMARY OF THE INVENTION

An aspect of the present invention is to eliminate the above-mentioned problems with the conventional technology. The present invention provides an information processing apparatus that allows easy recognition of a failure of a spread, a system, a display method, and a non-transitory computer-readable storage medium storing a program.

The present invention in one aspect provides an information processing apparatus comprising: a first display unit configured to display a preview screen including a preview image based on page data included in book data; a setting unit configured to set a spread attribute for laying out one page data included in the book data over a plurality of pages; and a display unit configured to display, if the page data set with the spread attribute does not satisfy a spread condition, information indicating that the spread condition is not satisfied in association with a preview image based on the page data set with the spread attribute together with the preview image based on the page data set with the spread attribute.

According to the present invention, it is possible to readily recognize a failure of a spread.

Further features of the present invention will become apparent from the following description of exemplary embodiments with reference to the attached drawings.

BRIEF DESCRIPTION OF THE DRAWINGS

FIGS. 17A to 17C are views for explaining page addition to resolve a failure of a spread.

DESCRIPTION OF THE EMBODIMENTS

Figure 1:
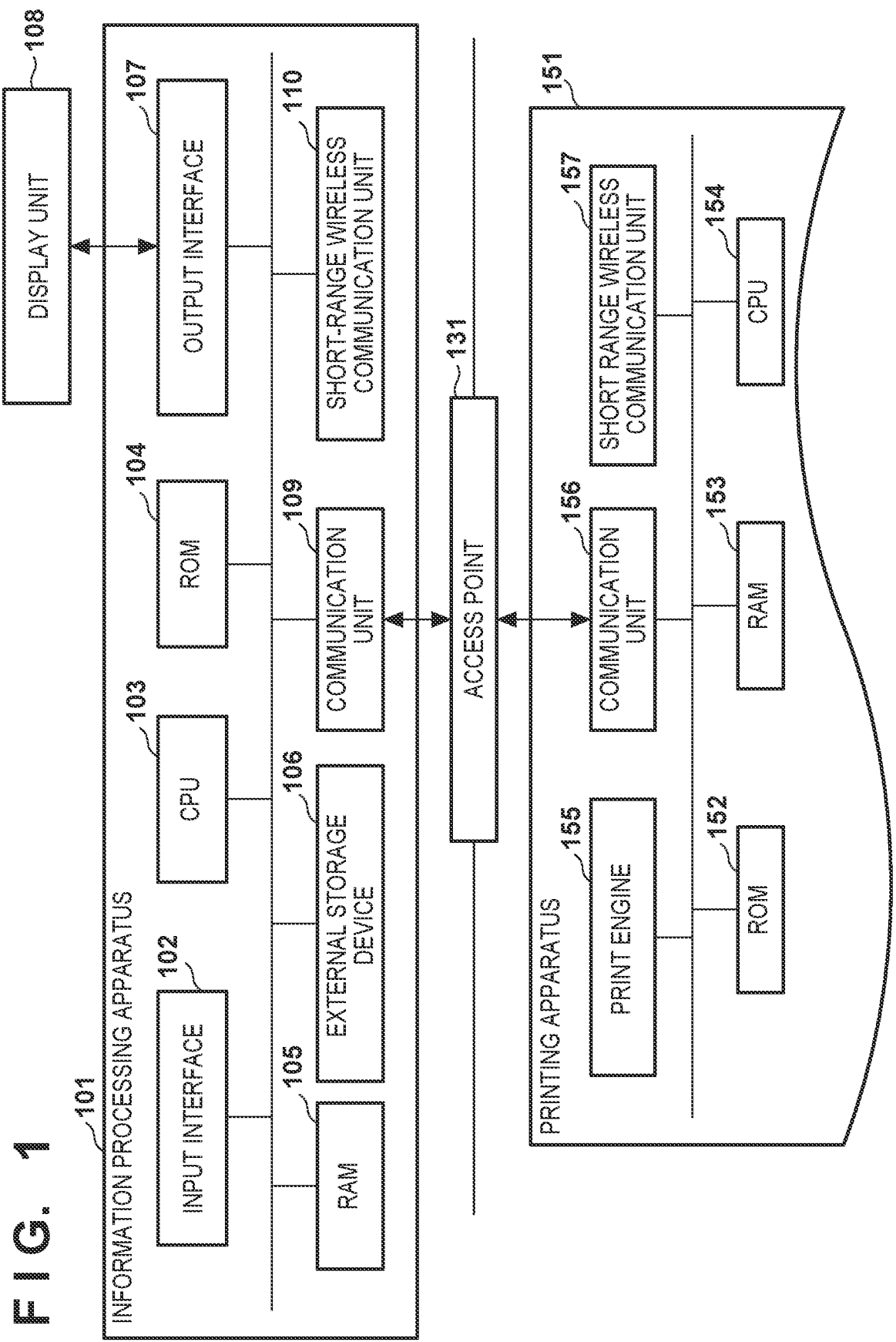
FIG. 1 is a block diagram showing an example of a system arrangement and examples of the hardware arrangements of apparatuses.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same constituent elements and a description thereof will be omitted.

(System and Apparatus Arrangements)

An example of a system arrangement according to this embodiment will be described with reference to FIG. 1. This system includes an information processing apparatus 101 and a printing apparatus 151, and executes print processing by transmitting print data prepared by the information processing apparatus 101 to the printing apparatus 151 via a network. Note that communication between the information processing apparatus 101 and the printing apparatus 151 can be performed via an access point 131 by, for example, a wireless LAN complying with the IEEE802.11 standard series. Note that although an embodiment based on a network arrangement using the access point 131 will be described below, another arrangement in which the information processing apparatus 101 and the printing apparatus 151 are communicable with each other may be used. For example, the information processing apparatus 101 and the printing apparatus 151 may be connected via a wired line (not shown). Furthermore, an apparatus having both the function of the information processing apparatus 101 and the function of the printing apparatus 151 may be used. In this case, information can be exchanged between the information processing apparatus 101 and the printing apparatus 151 via buses in the apparatuses and the like. A plurality of blocks shown in FIG. 1 may be integrated into one block and one block may be divided into a plurality of blocks. In addition, a block other than those shown in FIG. 1 may be added, and one or more of the blocks shown in FIG. 1 may be omitted.

The information processing apparatus 101 is an arithmetic apparatus capable of converting print target data into print data, such as a personal computer (PC), a smartphone, a mobile terminal, a notebook PC, a tablet terminal, or a PDA (Personal Digital Assistant). The printing apparatus 151 is an arbitrary printer capable of executing print processing by acquiring print data from an external apparatus such as the information processing apparatus 101. Assume that the printing apparatus 151 executes printing by the inkjet method in this embodiment. However, for example, the printing apparatus 151 may execute printing by another arbitrary method such as an electrophotographic method. The printing apparatus 151 may be a Multi Function Peripheral having a plurality of functions such as a copy function, a FAX function, and a print function.

The information processing apparatus 101 includes, for example, an input interface 102, a CPU 103, a ROM 104, a RAM 105, an external storage device 106, an output interface 107, a communication unit 109, and a short-range wireless communication unit 110. CPU, ROM, and RAM are acronyms for "Central Processing Unit", "Read Only Memory", and "Random Access Memory", respectively. Note that although FIG. 1 shows an example a case in which the information processing apparatus 101 displays information on a display device (display unit 108) such as an external display, the information processing apparatus 101 may include the display unit 108.

The input interface 102 is an interface for accepting a data input and an operation instruction from a user. The input interface 102 is formed by, for example, a physical keyboard, buttons, a touch panel, or the like. Note that the output interface 107 (to be described later) and the input interface 102 may be integrated so that output of a screen and acceptance of an operation from the user are performed using common hardware.

The CPU 103 serves as a system control unit, and controls the overall information processing apparatus 101. The ROM 104 stores permanent data such as control programs to be executed by the CPU 103, data tables, and an embedded operating system (to be referred to as an "OS" hereinafter) program. In this embodiment, the control programs stored in the ROM 104 perform software execution control such as scheduling, task switching, and interrupt processing under the management of the embedded OS stored in the ROM 104. The RAM 105 is implemented by an SRAM (Static Random Access Memory) or the like that needs a backup power supply. Note that the RAM 105 holds data by a primary battery (not shown) for data backup, and can thus store important data such as program control variables without volatilizing them. The RAM 105 can be provided with a memory area to store setting information and management data of the information processing apparatus 101, and the like. The RAM 105 can also be used as the main memory and work memory of the CPU 103.

The external storage device 106 saves an application for providing a print execution function, a print information generation program for generating print information interpretable by the printing apparatus 151, and the like. The external storage device 106 can also save various programs such as a control program for transmitting/receiving information to/from another apparatus (for example, the printing apparatus 151) connected via the communication unit 109, and various kinds of information to be used by these programs.

The output interface 107 is an interface used by the display unit 108 to perform control for displaying data and presenting information of the state of the information processing apparatus 101. The output interface 107 outputs control information and display target information for causing the display unit 108 to display the information. The display unit 108 includes an LED (Light Emitting Diode) and LCD (Liquid Crystal Display), and displays data and notifies the user of the state of the information processing apparatus 101. Note that a software keyboard including keys such as numerical value input keys, a mode setting key, an enter key, a cancel key, and a power key may be displayed on the display unit 108, and an input from the user may be accepted via the software keyboard.

The communication unit 109 includes a radio frequency (RF) circuit and a baseband circuit for executing data communication by performing connection to an external apparatus such as the printing apparatus 151. For example, the communication unit 109 can communicate with the printing apparatus 151 via the access point 131 existing separately from the information processing apparatus 101 and the printing apparatus 151. The access point 131 can be, for example, a device such as a wireless LAN router that operates in accordance with a wireless communication method complying with the IEEE802.11 standard series. Furthermore, the communication unit 109 may establish direct connection to the printing apparatus 151 in accordance with a protocol such as Wi-Fi (Wireless Fidelity) Direct®. If the printing apparatus 151 includes an access point (not shown), the communication unit 109 may be connected to the access point to establish direct connection to the printing apparatus 151. Note that the communication unit 109 can be configured to perform communication by Wi-Fi® but may perform communication by another wireless communication method such as Bluetooth®.

The short-range wireless communication unit 110 executes data communication by establishing wireless connection to the short-range wireless communication unit 157 of the printing apparatus 151 based on at least the fact that the printing apparatus 151 (external apparatus) enters a predetermined short-range area. The short-range wireless communication unit 110 performs communication by a communication method different from that of the communication unit 109, such as Bluetooth Low Energy (BLE).

The printing apparatus 151 includes, for example, a ROM 152, a RAM 153, a CPU 154, a print engine 155, a communication unit 156, and a short-range wireless communication unit 157.

The communication unit 156 includes a radio frequency (RF) circuit and a baseband circuit for performing connection to an external apparatus such as the information processing apparatus 101. The communication unit 156 corresponds to the communication unit 109 of the information processing apparatus 101, and performs communication by a wireless communication method such as Wi-Fi or Bluetooth. The communication unit 156 may be directly connected to the communication unit 109 of the information processing apparatus 101 by functioning as an access point or in accordance with a predetermined protocol, as described above, or may be connected to the communication unit 109 via the external access point 131 or the like. If the communication unit 156 functions as an access point, the communication unit 156 may have hardware for functioning as an access point, or may use software that allows the communication unit 156 to function as an access point. Note that although the information processing apparatus 101 and the printing apparatus 151 are connected to the one access point 131 in the example of FIG. 1, they may be connected to different access points connected to the network, and may be connected to each other via the network.

The short-range wireless communication unit 157 executes data communication by establishing wireless connection to the short-range wireless communication unit 110 of the information processing apparatus 101 based on at least the fact that the information processing apparatus 101 (external apparatus) enters a predetermined short-range area. The short-range wireless communication unit 157 corresponds to the short-range wireless communication unit 110 of the information processing apparatus 101, and performs communication by a wireless communication method such as BLE. Note that, for example, print information transmitted from the information processing apparatus 101 or the like has a large amount of data, requires high-speed large-capacity communication, and is thus received via the communication unit 156 capable of performing communication at a speed higher than that of the short-range wireless communication unit 157.

The RAM 153 is a memory similar to the RAM 105. The RAM 153 is provided with a memory area to store setting information and management data of the printing apparatus 151, and the like. The RAM 153 is also used as the main memory and work memory of the CPU 154, functions as a reception buffer for temporarily saving print information received from the information processing apparatus 101 or the like, and also saves various kinds of information. The ROM 152 stores permanent data such as control programs to be executed by the CPU 154, data tables, and an OS program. When the CPU 154 executes the control programs stored in the ROM 152, software execution control such as scheduling, task switching, and interrupt processing can be executed under the management of the embedded OS stored in the ROM 152. The CPU 154 serves as a system control unit, and controls the overall printing apparatus 151. Note that a memory such as an external HDD or SD card may be mounted as an optional device on the printing apparatus 151, and the information saved in the printing apparatus 151 may be saved in such memory.

The print engine 155 forms an image on a print medium such as a sheet using a printing material such as ink based on the information saved in the RAM 153 and the print information received from the information processing apparatus 101 or the like, and outputs a print result.

Figure 2:
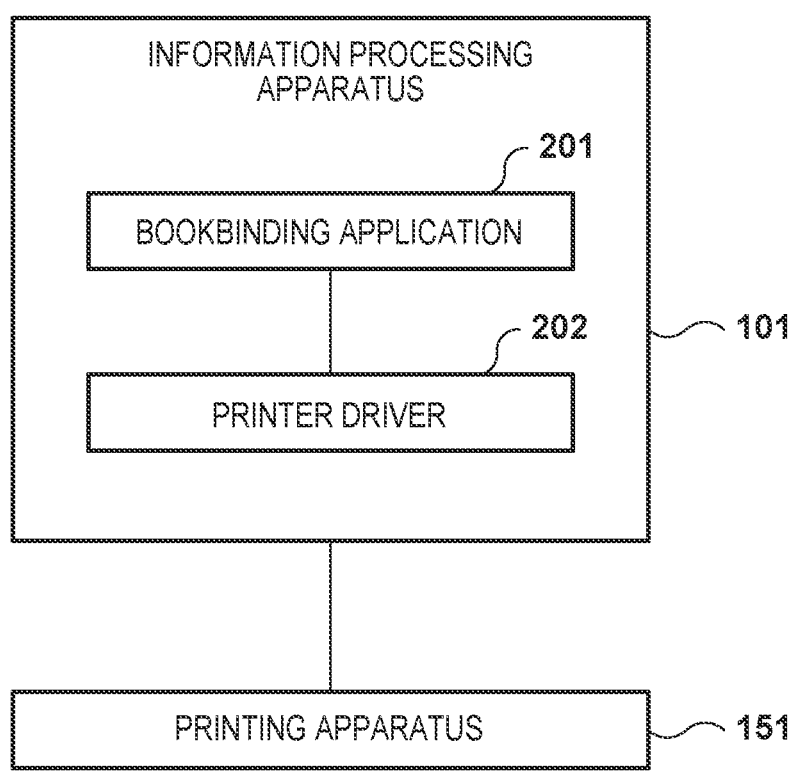
FIG. 2 is a block diagram showing an example of the software arrangement of the information processing apparatus.
Figure 4:
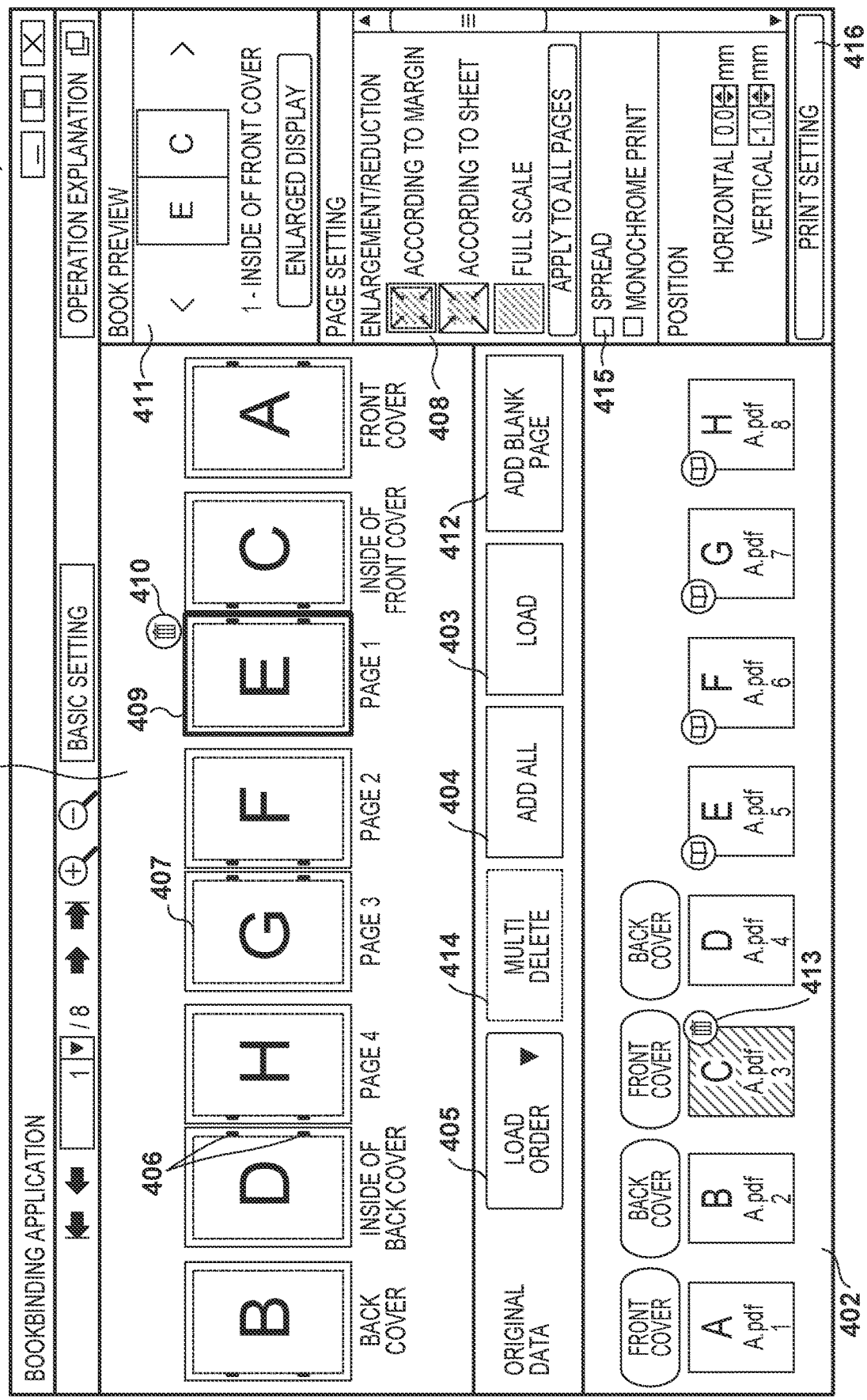
FIG. 4 is a view showing an example of an edit screen in the bookbinding application.

FIG. 2 is a block diagram showing an example of the functional arrangement of the information processing apparatus 101. The information processing apparatus 101 includes, for example, as functional components, a bookbinding application 201 that executes processing (to be described later), and a printer driver 202 that generates print data interpretable by the printing apparatus 151. When the user inputs a print instruction to the screen of the bookbinding application 201 (to be described later), the printer driver 202 receives application data output from the bookbinding application 201, and generates print data. Note that a print instruction in the screen of the bookbinding application 201 corresponds to, for example, the pressing of an OK button included in a screen displayed after a print setting button 416 shown in FIG. 4 is pressed. The user can designate a print area (page number, sheet number, or the like) using the screen displayed after the print setting button 416 shown in FIG. 4 is pressed. Then, when the printer driver 202 transmits the print data generated by the bookbinding application 201 to the printing apparatus 151, the printing apparatus 151 executes print processing.

(Overview of Operation of Bookbinding Application)

Figure 3:
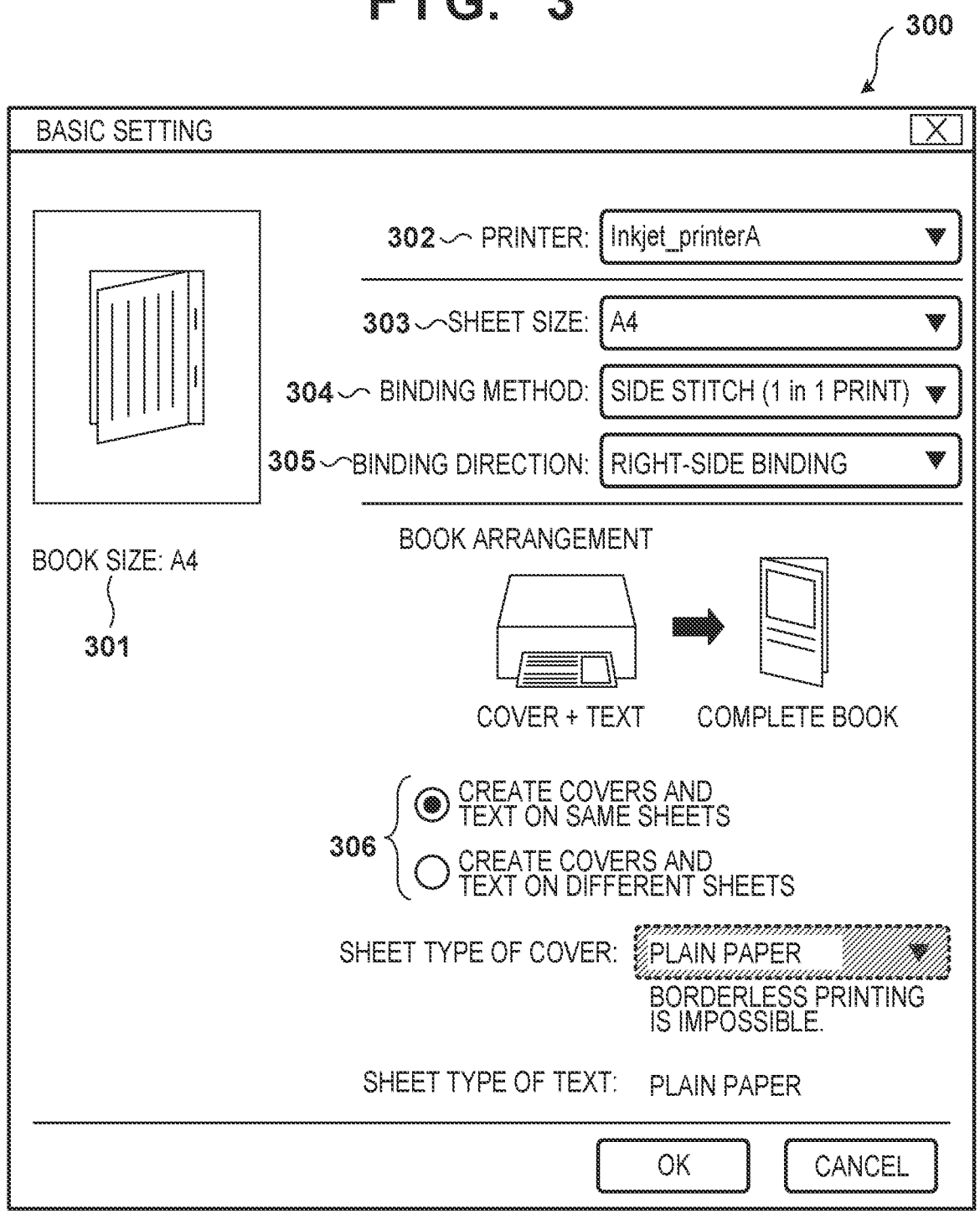
FIG. 3 is a view showing an example of the basic setting screen of a bookbinding application.

Subsequently, an example of the procedure of the bookbinding operation by the above-described bookbinding application 201 will be described. FIG. 3 shows an example of a basic setting screen displayed on the display unit 108 when the CPU 103 of the information processing apparatus 101 executes, for example, programs corresponding to the bookbinding application 201 stored in the ROM 104 and the external storage device 106. As an example, a basic setting screen 300 includes a post-bookbinding image 301, a printer selection region 302, a sheet size selection region 303, a binding method setting region 304, a binding direction setting region 305, and a cover sheet-related setting region 306.

The printer selection region 302 is a region where a printing apparatus to be used is selected. When a pull-down button in the printer selection region 302 is pressed by a user operation, a list of printing apparatuses usable by the information processing apparatus 101 is displayed. The user can select a printing apparatus to be used to perform print processing based on book data formed from a plurality of pages by the bookbinding application 201. Note that with respect to the list of the printing apparatuses displayed when the pull-down button in the printer selection region 302 is pressed, only printing apparatuses supportable by the bookbinding application 201 can be displayed. However, the present invention is not limited to this. For example, all the printing apparatuses usable by the information processing apparatus 101 may be displayed regardless of whether they can be supported by the bookbinding application 201.

The sheet size selection region 303 is a region where a sheet size to be used for bookbinding is selected. When a pull-down button in the sheet size selection region 303 is pressed by a user operation, a list of sheet sizes usable by the printing apparatus selected in the printer selection region 302 is displayed. The user can select, from the displayed list of the sheet sizes, one size corresponding to the size of a book to be created. Note that information of the sheet sizes usable by the printing apparatus selected in the printer selection region 302 can be acquired from the printing apparatus via, for example, the printer driver 202.

The binding method setting region 304 is a region where a binding method of a book is set. When a pull-down button in the binding method setting region 304 is pressed by a user operation, for example, "side stitch" and "saddle stitch" are selectably displayed. "Side stitch" is a binding method of performing bookbinding at a position a predetermined distance away from a spine portion of a book using a staple or the like. "Saddle stitch" is a binding method of performing bookbinding at a folding portion of doubled sheets using a staple or the like. If "saddle stitch" is selected, it is assumed that the sheets are doubled, and thus a 2-in-1 print setting can be selected automatically. Note that if "saddle stitch" is selected, for example, settings such as 4-in-1 other than 1-in-1 may be selectably displayed. Furthermore, "saddle stitch" is a binding method of generating a book by overlaying a plurality of printed sheets and then doubling them. Note that if "side stitch" is selected, a 1-in-1 print setting can be selected automatically. In this case as well, however, settings such as 2-in-1 and 4-in-1 may be selectably displayed. Note that if 2-in-1 is not selected for "saddle stitch" or if 1-in-1 is not selected for "side stitch", page allocation (to be described later) is different accordingly.

The binding direction setting region 305 is a region where a binding direction of a book is set. When a pull-down button in the binding direction setting region 305 is pressed by a user operation, for example, "right-side binding" and "left-side binding" are selectably displayed. In some cases, "upper binding" may be selectably displayed. "Right-side binding" indicates a binding direction that binds the right side of the front cover, and "left-side binding" indicates a binding direction that binds the left side of the front cover. In addition, "upper binding" indicates a binding direction that binds the upper portion of the cover. A string "binding direction" in the binding direction setting region 305 may be replaced by "open direction" or the like. Right-open corresponds to right-side binding and left-open corresponds to left-side binding. The setting in this region determines whether the pages of a book to be created advance from right to left or from left to right.

The cover sheet-related setting region 306 is a region where a cover sheet is set. For example, radio buttons that allow the user to select one of an item for creating covers and text by the same type of sheets and an item for creating covers and text by different types of sheets are displayed. Note that if, in the setting region 306, the covers and text are created by the same type of sheets, the sheet type (for example, "plain paper" or the like) of the text is set as the sheet type of the covers, and thus the region that allows selection of the sheet type of the covers is grayed out so as not to be selected. On the other hand, if the setting of creating covers and text by different types of sheets is selected in the setting region 306, the region that allows selection of the sheet type of the covers is activated. Then, when a pull-down button in the region where the sheet type of the covers is set is pressed, a list of selectable sheet types (for example, glossy paper, plain paper, and the like) is displayed. Note that, for example, if "plain paper" is selected, a character string "borderless printing is impossible" can be displayed, and if "glossy paper" is selected, a character string "borderless printing is possible" can be displayed. In addition, necessary information may be set for each sheet type, and a character string corresponding to the sheet type selected by a user operation may be displayed. Furthermore, if the setting of creating covers and text by different types of sheets is selected, a message such as "it is necessary to print by setting different sheets for cover/text" may be displayed.

When "OK" is pressed in the basic setting screen shown in FIG. 3, the screen transitions to an edit screen. The edit screen may be different in accordance with the setting items such as the binding method and the setting of whether the sheet type of the covers is set to be the same as that of the text. Examples of the edit screen corresponding to the basic settings will be described below.

[Case in Which Side Stitch Is Selected and Covers and Text Are Created by Same Type of Sheets]

FIG. 4 shows an example of the edit screen when the binding method is side stitch (1-in-1), right-side binding is selected, and the setting of using the same type of sheets for the covers and text is made. Note that the example of FIG. 4 shows an example of a state in which a document (original data) for eight pages (from a page where "A" is written to a page where "H" is written) has already been loaded. In a stage before the document is loaded, an edit region 401 and an original data region 402 are in a predetermined state (for example, a blank state) in which the user can recognize that no document has been loaded. Note that in, for example, the stage before the document is loaded, a message such as "please load original data to be put in a book" may be displayed in the edit region 401, and a message that notifies the user of a method of loading data may further be displayed. Note that such message may be displayed in the original data region 402. Another method such as display of a dialog may be used to prompt the user to load original data. Note that one original data may be loaded or a plurality of original data may be loaded.

When the user clicks on a "load" button 403, for example, a file selection dialog is displayed, and the user selects, from a displayed file list, a file (original data) to be used to create a book. When a file is selected, page data included in the file are expanded in the original data region 402. Similarly, a result of automatically allocating the page data included in the file based on a page order and the setting contents in the basic setting screen 300 can be displayed in the edit region 401. Automatic page allocation can be performed so that, for example, page data of the first to fourth pages in the file are set as "front cover", "back cover", "back surface (inside) of front cover", and "back surface (inside) of back cover", respectively, and page data of the subsequent pages are set as text. The edit region 401 shown in FIG. 4 shows an example of a case in which automatic page allocation is performed in this way. In the expanded file, the page data of the first page where "A" is written is allocated to the front cover and the page data of the second page where "B" is written is allocated to the back cover. Then, the page data of the third page where "C" is written is allocated to the inside of the front cover and the page data of the fourth page where "D" is written is allocated to the inside of the back cover. That is, the bookbinding application 201 generates book data as a result of allocating the page data included in the original data, and displays a preview image of each page in the edit region 401 of FIG. 4 based on the generated book data. Note that the page data of the first and second pages of the file may be allocated to "front cover" and "inside of front cover", and the data of the last page and the second page from the last in the file may be allocated to "back cover" and "inside of back cover". Note that FIG. 4 and some following examples show an example of a case in which right-side binding is selected, and the front cover is displayed at the rightmost end and the back cover is displayed at the leftmost end. However, if left-side binding is selected, the front cover is displayed at the leftmost end and the back cover is displayed at the rightmost end. The screen of FIG. 4 may be called a preview screen since it includes preview images.

Note that when contents of the file are expanded in the original data region 402, for example, a confirmation message such as "do you want to perform automatic page allocation?" may be displayed to accept user determination of whether to automatically perform page allocation. In this case, if the user approves automatic page allocation, a result of performing automatic page allocation is displayed in the edit region 401; otherwise, the edit region 401 may remain blank. Alternatively, the page data included in the selected file may only be expanded in the original data region 402 without performing automatic page allocation regardless of user determination. Note that even if automatic page allocation is not performed, when the user clicks on an "add all" button 404, automatic page allocation of the page data is performed in the order of the pages included in the file.

Note that when a plurality of files are read out, all page data included in the plurality of files are expanded in the original data region 402. At this time, the order of the page data to be expanded can be decided by a pull-down menu 405. For example, if, as shown in FIG. 4, "load order" is selected, the page data are expanded in the original data region 402 in an order such that page data of a file selected earlier is displayed on the left side. To the contrary, if, for example, "file name order" (not shown) is selected, the page data are expanded in ascending (descending) order of file names. If, for example, a file whose name is "A.pdf" is opened after a file whose name is "B.pdf", when "load order" is selected, page data of "A.pdf" is displayed on the right side of a position at which page data of "B.pdf" is displayed. On the other hand, if "file name order" is selected, even if "B.pdf" is opened first, the page data of "B.pdf" is displayed on the right side of a position at which the page data of "A.pdf" is displayed. Note that the sort order is not limited to the load order or the file name order, and various orders such as the order of the file creation date (update date) and the order of the use frequency in this application can be used.

The page data allocated in order of appearance when the pages of the book after completion are turned over are displayed in the edit region 401. Note that the page data are included in the above-described book data. That is, the book data includes page data corresponding to a plurality of pages forming the book. Furthermore, display is performed so that the distance between two pages displayed in a spread is shorter than the distance to another page that is adjacent but is not displayed in a spread. This allows the user to readily determine a page forming a spread of the book and a page forming no spread. In the example of FIG. 4, when the distance between the page where "C" is written and the page where "E" is written is sufficiently short, the user can readily recognize that these pages are pages forming a spread. On the other hand, the distance between the page where "E" is written and the page where "F" is written is longer than that between the page where "C" is written and the page where "E" is written. This allows the user to readily recognize that these pages are adjacent to each other but are not pages forming a spread. In this way, the images of all the pages are displayed in the edit region 401 based on the page data of the pages included in the book data. Note that the example of FIG. 4 shows an example of a case in which all the pages included in the book data can be displayed as a whole. However, if the number of pages increases while maintaining the state in which all pages are displayed, the size of each page may become small. To cope with this, the bookbinding application 201 can be configured to perform enlargement/reduction display of each page. At this time, if all the pages cannot be displayed in the edit region 401, a display area can be moved by, for example, displaying a scroll bar in the lower portion of the edit region 401.

Note that if side stitch is selected, binding positions 406 by a staple are also displayed. The binding positions 406 can be displayed by, for example, a predetermined color (for example, red) so that the user can recognize them. The display of the binding positions 406 can be printed intact, and the user can bind the book at the positions using the staple.

In each page displayed in the edit region 401, a boundary 407 indicating the boundary between a printable region and a margin region is displayed. When the user inputs each setting value in a region of page setting 408, the page data is laid out in the page based on the setting values. For example, in the page setting 408, the user sets whether to enlarge/reduce the original data in accordance with the margin or sheet, sets whether to display in a full scale, and sets vertical and horizontal positions. The vertical and horizontal positions are set by moving the position of the original data in the page upward or leftward by a negative value, and moving the position of the original data in the page downward or rightward by a positive value. This allows the user to set in detail how the page data is laid out in the page. Note that these settings can be applied for each page. For example, in the state in which the page where "E" is written is selected in the edit region 401, when the setting values are input in the page setting 408, the setting values are applicable to only the selected page. Note that when "apply to all pages" is selected in the page setting 408, the input settings are collectively applied to all the pages. Note that at this time, the user can recognize the selected page when a page frame 409 of the page where "E" is written is highlighted, thereby recognizing that settings are being made for the specific page. In addition, the user can delete the page from the edit region 401 by pressing, for example, an icon 410.

Figure 5:
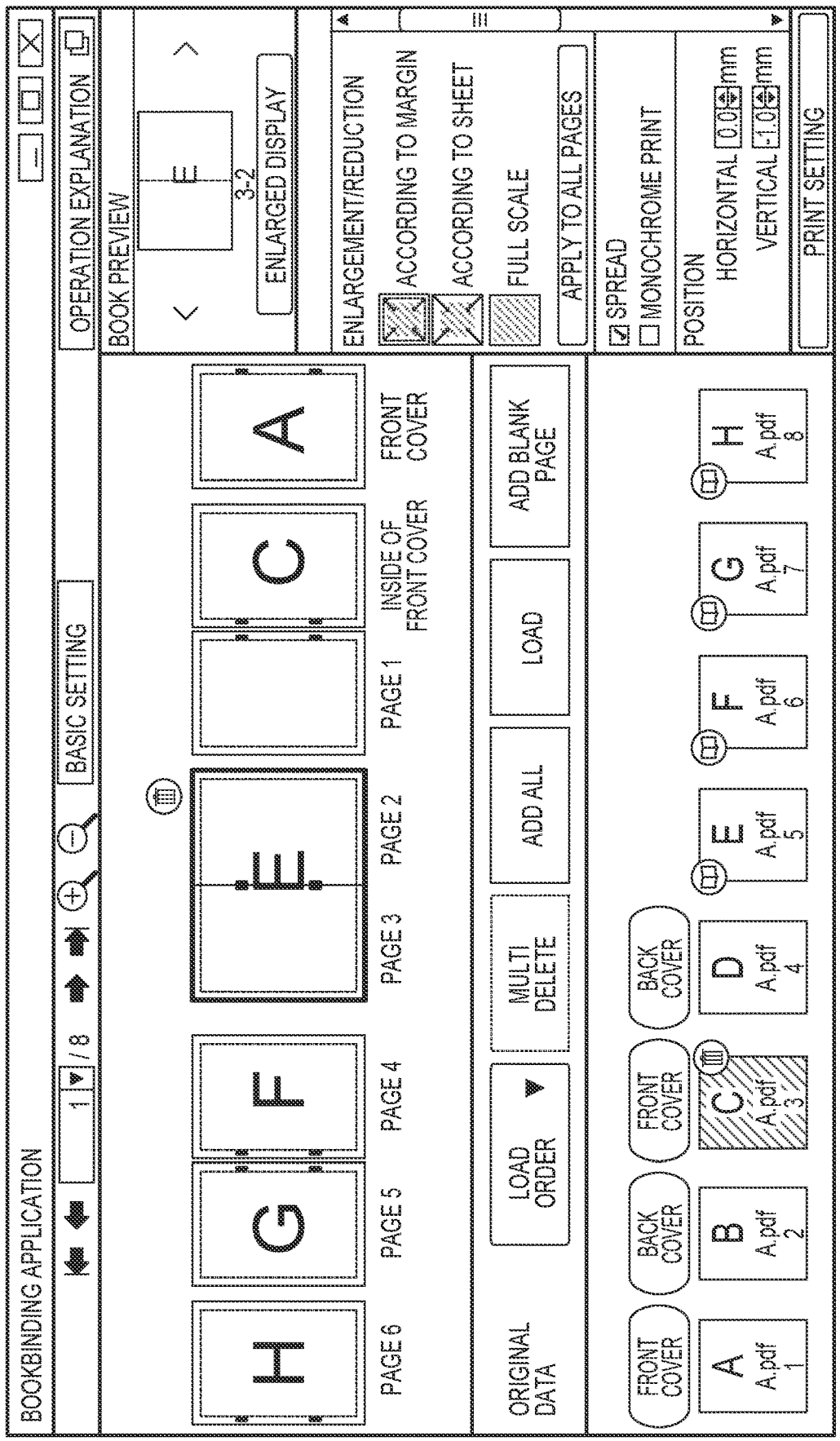
FIG. 5 is a view showing an example of the edit screen in the bookbinding application.

The user can set a spread attribute for one page data by selecting a "spread" checkbox 415. FIG. 5 shows a display example when the "spread" checkbox 415 is selected in the state in which the page where "E" is written is selected, as shown in FIG. 4. When the "spread" checkbox 415 is selected, a spread attribute is imparted to the page data corresponding to the selected page. Then, the page data to which the spread attribute is imparted is allocated to a region of two pages in the edit region. Although different from FIGS. 4 and 5, a case in which the "spread" checkbox 415 is selected in a state in which an even-numbered page of the text (a right page of a spread for right-side binding or a left page of a spread for left-side binding) is selected will be described. In this case, page data allocated to the selected page is displayed at the center of the spread including the selected page. Then, the page data are reallocated so that the pages after the selected page are shifted backward by one page. That is, in this case, the bookbinding application 201 generates a new spread region by adding one page after the selected page, and lays out the page data of the selected page at the center of the new spread region.

On the other hand, if an odd-numbered page of the text, like the page where "E" is written in FIG. 4, is selected, the next page of the selected page is included in a spread different from a spread including the selected page. Note that the odd-numbered page indicates the left page of the spread for right-side binding or the right page of the spread for left-side binding. Therefore, if only one page is added after the selected page to generate a new spread region, and one page data is allocated to the new spread region, the bookbinding application 201 cannot display the page data as a spread. Therefore, if, for example, the "spread" checkbox 415 is selected in the state in which the odd-numbered page of the text is selected, as shown in FIG. 5, one page can be added not only after but also before the selected page. This allows the bookbinding application 201 to allocate the page data of the selected page to one spread region. Note that in this case, the page data are reallocated so that the pages after the selected page are shifted backward by two pages.

When the "spread" checkbox 415 is selected in the state in which the odd-numbered page is selected, a message for notifying the user that one page is added before the selected page may be displayed. If the user approves addition of the page, a spread attribute is set for the selected page data, and the selected page data may be laid out over a plurality of pages. This can prevent addition of a page unintended by the user. Note that if the user does not approve addition of a page, setting of a spread attribute may be canceled. When the "spread" checkbox 415 is selected in the state in which the odd-numbered page is selected, a space for one page may be added after the selected page to allocate the selected page to a region for two pages without displaying the above-described message. Note that when such allocation is performed, the bookbinding application 201 may display a message indicating that the page data of the selected page is not laid out intact in the spread region.

When the "spread" checkbox 415 is cleared after the spread attribute is set for the page data, the spread attribute of the page data is released. As a result, the (preceding and succeeding) pages added at the time of allocation are deleted, and the pages after the pages are reallocated. Note that, for example, a message indicating whether to delete pages such as blank pages added when the odd-numbered page is allocated to the spread may be displayed.

Note that when horizontally long page data is dragged and dropped in the edit region 401 (or allocated automatically), a spread attribute may be set automatically for the page data. In this case, the "spread" checkbox 415 is selected automatically. Furthermore, if the insertion position of the page data is an odd-numbered page, a blank page or the like may be inserted before the page, as described above, or predetermined error display or the like may be performed. When, after the spread attribute is set for the horizontally long page data and the page data is allocated to the spread region, the "spread" checkbox 415 is cleared, the spread attribute of the horizontally long page data is released. As a result, the horizontally long page data can be allocated to one-side page forming the spread (for example, by reduction or rotation). Note that the horizontally long page data may be allocated to one-side page, similarly to a vertically long page without automatically setting the spread attribute for the horizontally long page data. Referring back to FIG. 4, with respect to the selected page, an image of the spread including the page after bookbinding is displayed as a book preview 411, and thus the user can readily recognize the state of the selected page after completion of the book. Note that when "<" or ">" in the preview is selected, a preview of an adjacent spread can be displayed. At this time, the selected page may move together, or only the pages of the preview may move without synchronizing the selected page and the preview with each other.

The user can operate the page data expanded in the original data region 402 for each page. For example, the user can select one page data in the original data region 402, and drag and drop it in the edit region 401, thereby adding the page data as one page of the book. FIG. 4 shows a state in which the page where "C" is written is selected from the data expanded in the original data region 402. If the selected page data is dragged and dropped in an arbitrary position of the edit region 401, it is incorporated in the book data as a page corresponding to the dropped position. For example, the page data is dragged and dropped in a predetermined area, in the edit region 401, between the page where "F" is written and the page where "G" is written. This operation causes the bookbinding application 201 to generate book data in which the page data where "C" is written is inserted between the page data of "F" and the page data of "G". Note that if such page data is inserted, the spread relationship is reconstructed based on the book data after insertion. That is, the page of "F" and the newly added page of "C" have the spread relationship, and the page of "G" has the spread relationship with the page of "H" due to addition of the page of "C".

Furthermore, the user can add a blank page by pressing an "add blank page" button 412. For example, if the "add blank page" button 412 is pressed in the state in which the page where "C" is written is selected, a blank page is added between the page where "C" is written and the page where "E" is written. In this case, the bookbinding application 201 generates book data including blank page data between the page data of "C" and "E". A blank page may be added to the right or left side of the selected page in accordance with a predetermined rule or, if two pages are selected, may be added between the two pages. Thus, if the back surfaces of the covers are desirably blank, or in accordance with the user's preferences or the like, a blank page can be added to an arbitrary position in the book.

Note that if the page data in the original data region 402 is used in the edit region 401, information for specifying it is added at the upper left position of each data. Referring to FIG. 4, the page data where "A" is written and the page data where "C" is written are used for the front cover (and its back surface). Then, the page data where "B" is written and the page data where "D" is written are used for the back cover (and its back surface). Then, other page data are used for the text. This allows the user to recognize that, for example, page data to be included as a page in the book is not used in the edit region 401 or page data not to be included in the book is unwantedly used. In addition, the user can recognize whether page data to be used for the cover is appropriate. The user can delete page data not to be used for creation of the book in the original data region 402. For example, the user can select an icon 413 displayed at the upper right position of the data in the selected state to delete the selected page data from the original data region 402. This can prevent an edit operation from becoming cumbersome due to the existence of many data not to be used in the original data region 402.

Furthermore, in the original data region 402, it is possible to select a plurality of data and collectively operate them. For example, in a state in which the page data where "C" is written and the page data where "D" is written are selected, the page data are collectively dragged and dropped in the edit region 401. This operation can insert these page data into the book data as two successive pages. The same applies to a case in which three or more page data are selected. Furthermore, if a "multi delete" button 414 is pressed in a state in which a plurality of page data are selected, the plurality of page data can collectively be deleted from the original data region 402. Note that if one data is selected or no data is selected, the "multi delete" button 414 can be disabled, for example, grayed out.

Upon completion of editing of the book, as described above, the user can execute printing of the book by pressing a print setting button 416. That is, the bookbinding application 201 outputs application data based on the book data including the page data arranged in an order according to the above edit processing. Then, the printer driver 202 generates print data based on the output application data. Note that for side stitch (1-in-1) where n is an integer of 1 or more, double-sided printing is executed so that the (2n-1)th page and 2nth page have the front-back relationship. Note that double-sided printing is executed so that the front cover and its back surface have the front-back relationship and the back cover and its back surface have the front-back relationship.

[Case in which Saddle Stitch is Selected and Covers and Text are Created by Same Type of Sheets]

Figure 6:
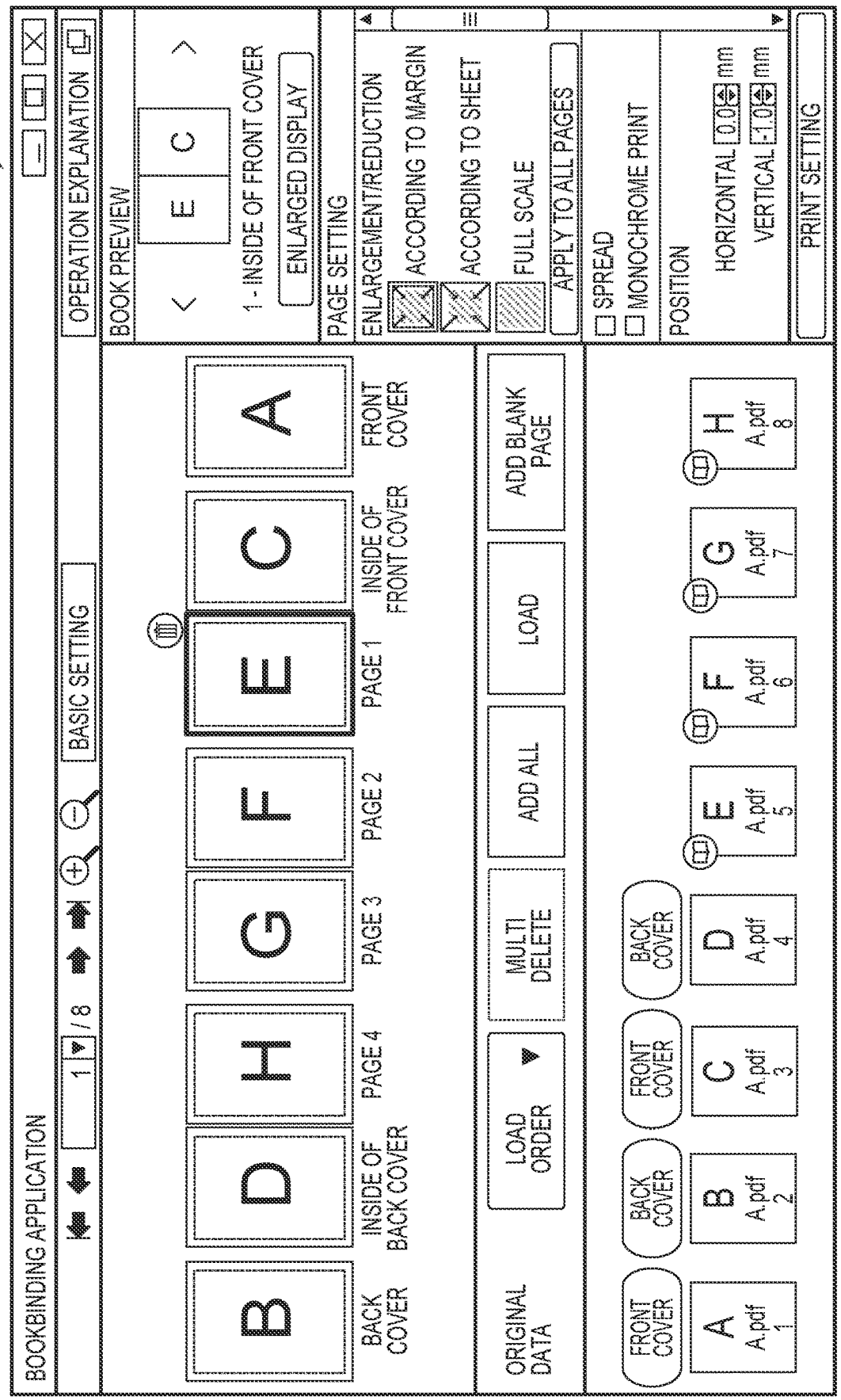
FIG. 6 is a view showing an example of the edit screen in the bookbinding application.

Subsequently, an example of the edit screen when the binding method is saddle stitch (2-in-1), and the setting of using the same type of sheets for the covers and text is made will be described with reference to FIG. 6. The edit screen in this case is almost the same as that shown in FIG. 4. However, in the case of saddle stitch, the binding positions are between the pages, and thus the marks indicating the binding positions are not displayed, as shown in a screen example 600 of FIG. 6. Note that when printing on a paper surface, the marks indicating the binding positions may be displayed at predetermined positions between the pages.

Note that if the binding method is saddle stitch (2-in-1), 2-in-1 double-sided printing is executed, and thus the number of pages per sheet is four. Therefore, if the number of pages added to the edit region 401 is not a multiple of 4, a page such as a blank page can be added to the end so that the total number of pages is a multiple of 4.

Note that if the binding method is saddle stitch (2-in-1) and right-side binding is selected, when N represents the total number of pages and m is an integer of 0 or more, the front surface of one sheet including the (N/2+2m+2)th page on the right side and the (N/2−2m−1)th page on the left side is printed. Then, the back surface of the sheet including the (N/2−2m)th page on the right side and the (N/2+2m+1)th page on the left side is printed. If, for example, N=8, the front surface including the sixth page on the right side and the third page on the left side and the back surface including the fourth page on the right side (the back side of the third page) and the fifth page on the left side (the back side of the sixth page) are printed on both surfaces of one sheet. Similarly, the front surface including the eighth page on the right side and the first page on the left side and the back surface including the second page on the right side (the back side of the first page) and the seventh page on the left side (the back side of the eighth page) are printed on both surfaces of one sheet. The front surface on which the back cover is laid out on the right side and the front cover is laid out on the left side and the back surface on which the back surface of the front cover is laid out on the right side and the back surface of the back cover is laid out on the left side undergo double-sided printing. Note that the same applies to left-side binding except that the above relationship between the right and left sides is reversed.

[Case in which Side Stitch is Selected and Covers and Text are Created by Different Types of Sheets]

Figure 7:
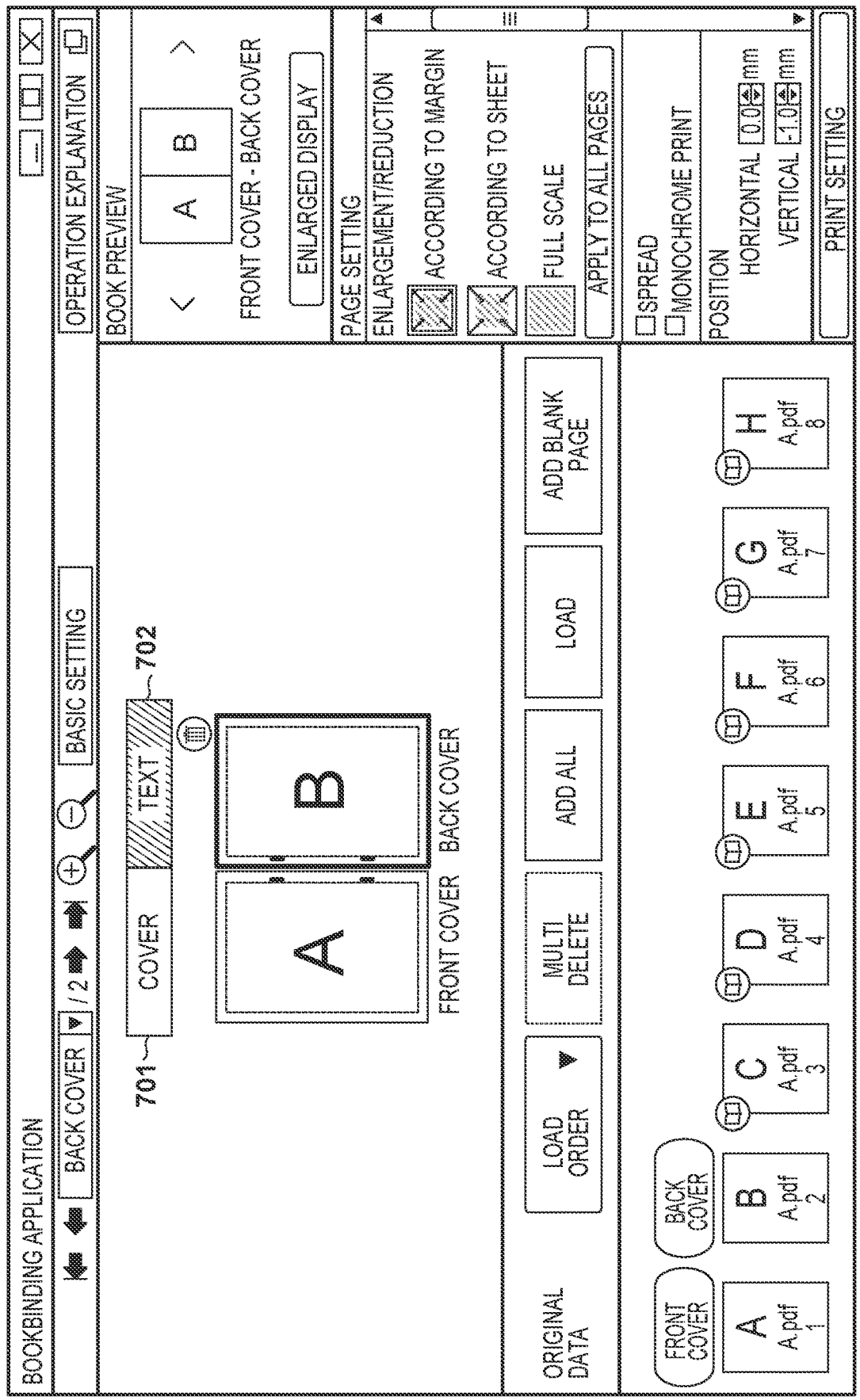
FIG. 7 is a view showing an example of the edit screen in the bookbinding application.
Figure 8:
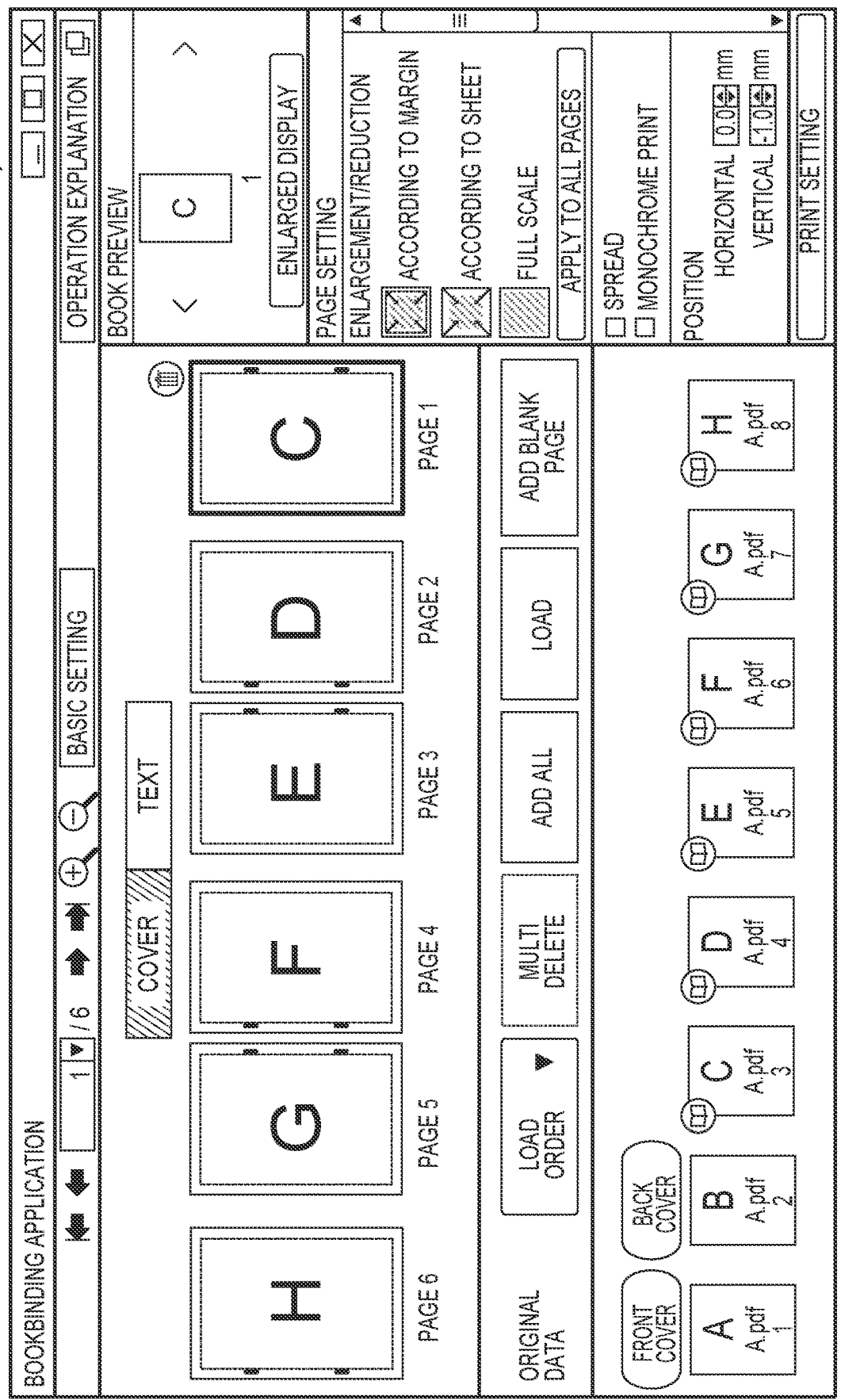
FIG. 8 is a view showing an example of the edit screen in the bookbinding application.

Subsequently, an example of the edit screen when the binding method is side stitch (1-in-1) and the setting of using different types of sheets for the covers and text is made will be described with reference to FIGS. 7 and 8. When different types of sheets are used for the covers and text, a cover edit screen 700 shown in FIG. 7 and a text edit screen 800 shown in FIG. 8 are used. Note that this form need not always be used but at least the screen is configured to execute printing of the covers and text independently. That is, the user needs to individually issue a cover print instruction and a text print instruction to the bookbinding application 201. If the cover edit screen 700 and the text edit screen 800 are separated, buttons for switching between the edit screens, for example, a cover selection button 701 and a text selection button 702 in FIG. 7 are displayed in the edit region 401. When the user selects the cover selection button 701, the cover edit screen 700 shown in FIG. 7 is displayed. When the user selects the text selection button 702, the text edit screen 800 shown in FIG. 8 is displayed. Note that these buttons may be displayed outside the edit region 401. Instead of the form of the button, for example, a tab form may be used. That is, a tab for the cover edit screen and a tab for the text edit screen may be displayed, and one of the tabs may be selected to switch the screen.

In the cover edit screen, only the front cover and the back cover are displayed, as shown in FIG. 7. Note that the front cover and the back cover are displayed in a form when viewing the book from the spine side. That is, for right-side binding, the front cover is displayed on the left side and the back cover is displayed on the right side. On the other hand, for left-side binding, the front cover is displayed on the right side and the back cover is displayed on the left side. If side stitch is used, binding positions are displayed. However, in the cover edit screen, the binding positions are displayed on the center side when the front cover and the back cover are laid out side by side, as shown in FIG. 7. In the cover edit screen 700, the positional relationship between the front cover and the back cover is reversed, as compared with the edit screen, shown in FIG. 4 or 6, in which the covers and the text are collectively edited. This display allows the user to readily recognize how the book after bookbinding looks like from the spine side when the book is opened.

Note that in this embodiment, if different types of sheets are used for the covers and text, the back surface of the front cover or that of the back cover is not used (that is, the back surface is blank). The present invention, however, is not limited to this. If the back surface of the front cover or that of the back cover is used, the cover edit screen displays, for example, the back surface of the front cover adjacent to the front cover and the back surface of the back cover adjacent to the back cover. In the example of FIG. 7, the back surface of the front cover can be displayed on the left side of the front cover and the back surface of the back cover can be displayed on the right side of the back cover.

As shown in FIG. 8, in the text edit screen, the text except for the front cover and the back cover (and their back surfaces) is displayed in the edit region. The edit screen shown in FIG. 8 is the same as that shown in FIG. 4 except that the front cover, the back cover, and their back surfaces are not included.

[Case in Which Saddle Stitch Is Selected and Covers and Text Are Created by Different Types of Sheets]

The edit screen when saddle stitch is selected and the setting of using different types of sheets for the covers and text is made is the same as that shown in FIG. 7 or 8 except that the marks of the binding positions are not displayed. Note that for saddle stitch, the number of pages needs to be a multiple of 4, as described above. However, if different types of sheets are used for the covers and text, the number of pages of the text needs to be a multiple of 4. That is, in the above-described example, adjustment is performed so that the total number of pages of the covers and text is a multiple of 4. In this example, however, adjustment is performed so that the number of pages of only the text is a multiple of 4. As a result, in this example, if the back surfaces of the covers undergo single-sided printing, the total number of pages of the covers and text is not a multiple of 4 (when a is an integer, the total number of pages is given by (4a+2)). For example, if an edit operation is performed so that the text includes data for six pages, 2 blank pages or the like is inserted so that the number of pages of the text is a multiple of 4.

Figure 9:
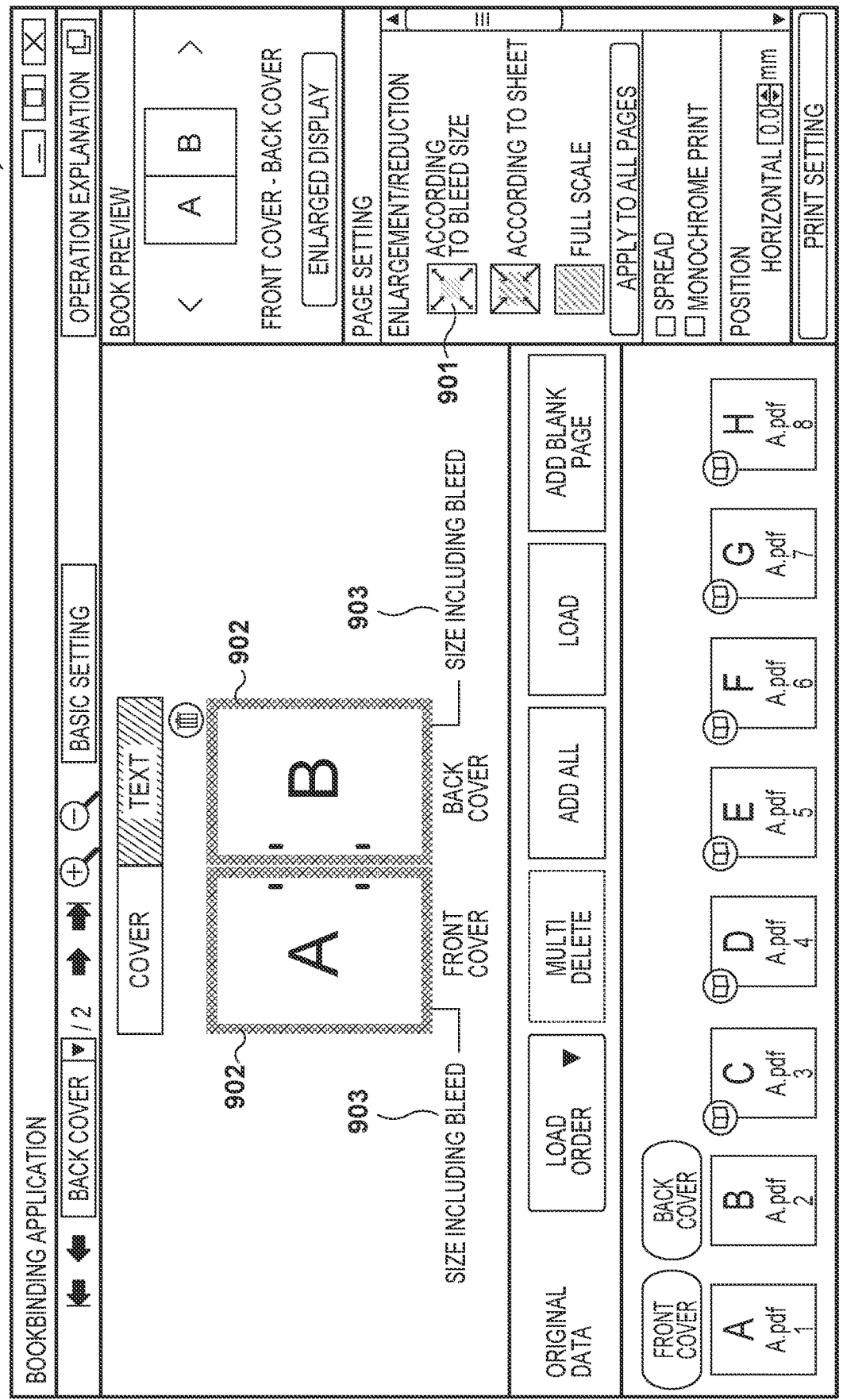
FIG. 9 is a view showing an example of the edit screen in the bookbinding application.

Note that if the setting of using different types of sheets for the covers and text is performed, the covers can undergo borderless printing by using, for example, glossy paper. FIG. 9 shows an example of the edit screen in this case. When executing borderless printing, so-called "bleed" needs to be added such that a print target image has a size larger than the finished size. Therefore, if paper such as glossy paper that can undergo borderless printing is selected, a region 902 of a size including bleed and an explanation 903 can be displayed. Furthermore, an option 901 used to adapt to a size including bleed by enlargement/reduction of page data is displayed. This allows the user to create covers by borderless printing by only performing a simple operation.

Upon completion of the edit processing using the screens shown in FIGS. 4 to 9, the user selects a print setting button included in each of these screens. The user performs further print setting processing using a print setting screen selected by selecting the print setting button, thereby selecting print execution. This processing sends application data generated by the bookbinding application to the printer driver corresponding to the printer selected in FIG. 3, and the printer driver generates print data based on the application data. Note that if the covers and text are printed on the same type of sheets, the application data includes pages laid out in the covers and the pages laid out in the text. On the other hand, if the covers and text are printed on the different types of sheets, the covers and the text are printed independently. Therefore, the above-described print setting screen prepares an option for selecting the covers or the text as a print target. In this case, if the user instructs printing in the state in which the covers are selected, the application data includes only pages laid out in the covers, and the printer driver generates print data for the covers. On the other hand, if the user instructs printing in the state in which the text is selected, the application data includes only pages laid out in the text, and the printer driver generates print data for the text.

An arrangement according to this embodiment will be described below, in which if data having the spread attribute fails without satisfying the condition of a spread layout on the preview display screen for layout editing, a warning for the failed portion is displayed on a page layout.

Figure 10:
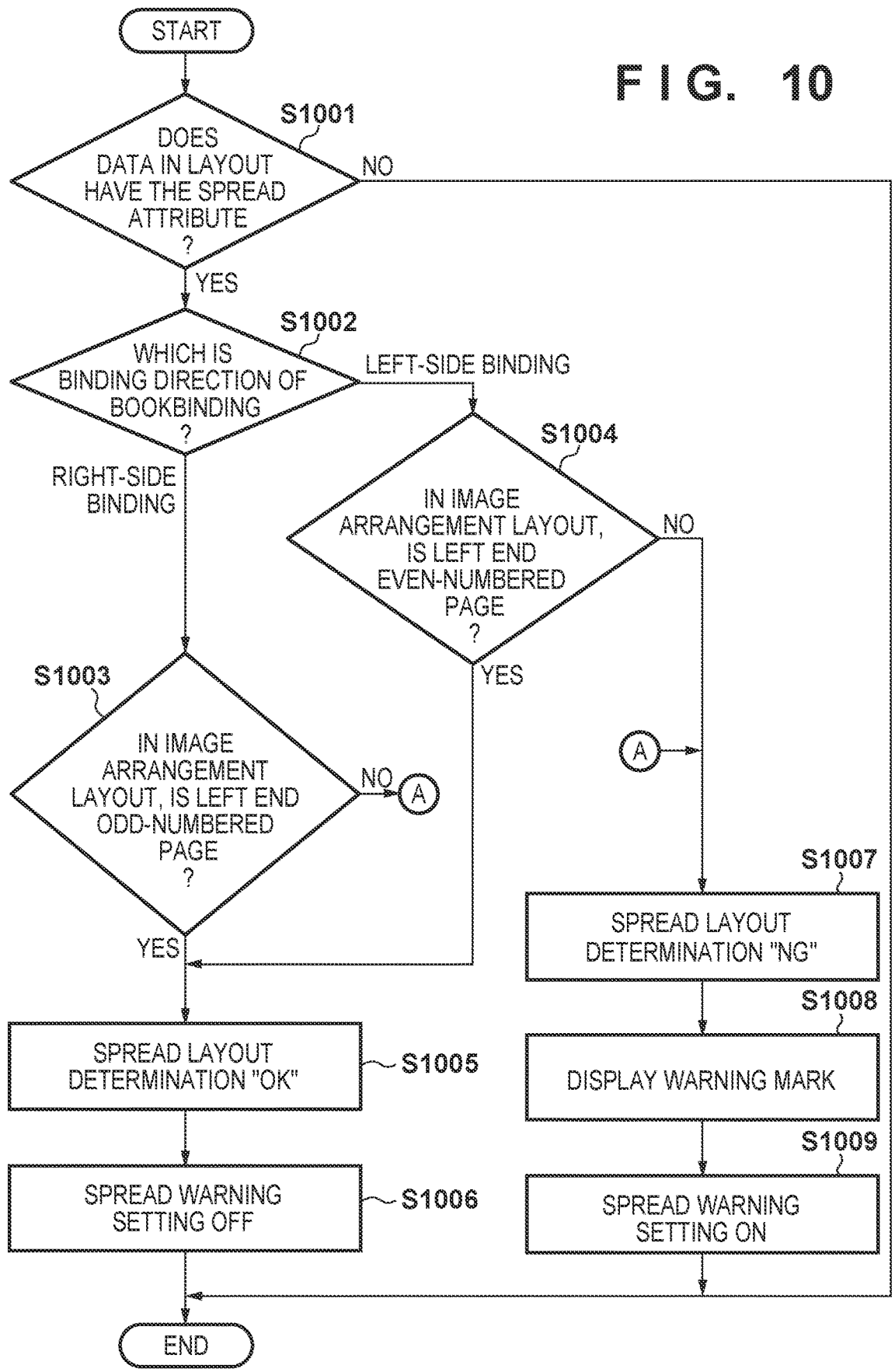
FIG. 10 is a flowchart illustrating spread layout determination processing.

FIG. 10 is a flowchart illustrating spread layout determination processing. Each process shown in FIG. 10 is implemented when, for example, the CPU 103 loads the program stored in the ROM 104 into the RAM 105 and executes it. The processing of FIG. 10 starts when allocating the original file in the original data region 402 to pages. A spread warning setting flag is secured in the RAM 105.

In step S1001, based on the attributes of the page data to be laid out, the CPU 103 determines whether page data having the spread attribute exists. If it is determined that such page data exists, the process advances to step S1002; otherwise, the processing of FIG. 10 ends.

In step S1002, based on bookbinding setting contents, the CPU 103 determines whether the binding direction is right-side binding or left-side binding. The determination processing in step S1002 is performed based on, for example, the setting information in the binding direction setting region 305 in FIG. 3. If it is determined that the binding direction is right-side binding, the process advances to step S1003. If it is determined that the binding direction is left-side binding, the process advances to step S1004.

In step S1003, the CPU 103 determines whether the left half of the page data having the spread attribute is laid out as an odd-numbered page. In this embodiment, in the case of right-side binding, the left page of the set of the pages that can be spread is an odd-numbered page. Therefore, if it is determined in step S1003 that the left half of the page data is laid out as an odd-numbered page, the page data is laid out as a spread appropriately. Thus, if YES is determined in step S1003, the CPU 103 determines in step S1005 that the spread layout is "OK" since the allocation state of the page data having the spread attribute satisfies the condition of the spread layout. In this case, it is unnecessary to make a warning notification that the spread layout fails. Thus, in step S1006, the CPU 103 turns off the spread warning setting flag. After that, the processing of FIG. 10 ends.

Figure 12:
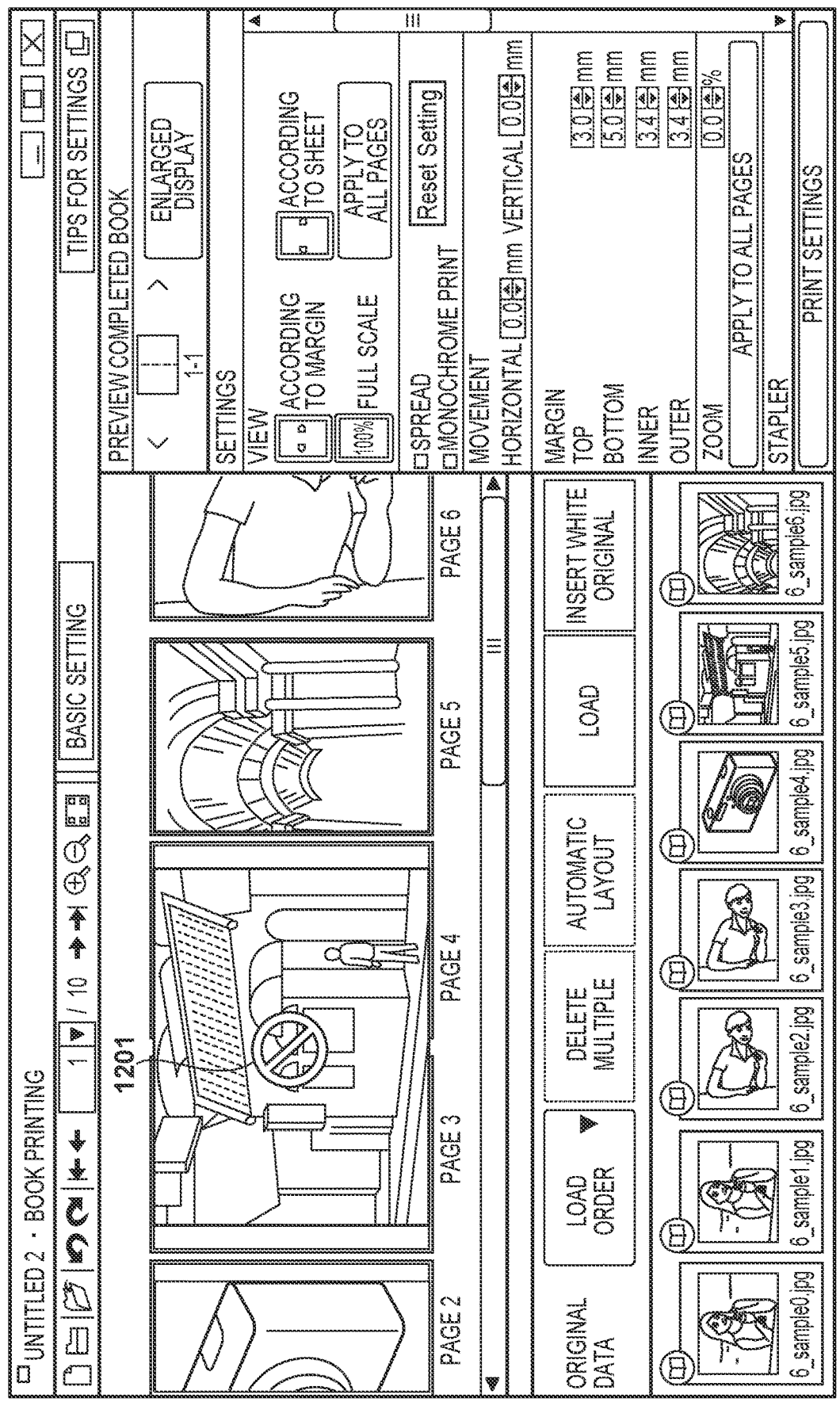
FIG. 12 is a view showing a warning screen.

On the other hand, if it is determined in step S1003 that the left half of the page data having the spread attribute is not laid out as an odd-numbered page, the page data having the spread attribute is laid out on the front and back surfaces of one sheet. That is, the page data is not laid out as a spread appropriately. Therefore, in step S1007, the CPU 103 determines that the spread layout is "NG" since the allocation state of the page data having the spread attribute does not satisfy the condition of the spread layout. In this case, in step S1008, the CPU 103 displays a warning mark indicating that the spread layout fails. This warning mark is displayed on a preview image based on the page data as the current processing target, as shown in, for example, FIG. 12. Note that FIG. 12 shows merely an example, and the warning mark need only be displayed in association with the preview image based on the processing target page data. For example, the warning mark may be displayed near the preview image based on the processing target page data. Then, in step S1009, the CPU 103 turns on the spread warning setting flag. After that, the processing of FIG. 10 ends.

Referring back to step S1002, if it is determined in step S1002 that the binding direction is left-side binding, the process advances to step S1004. In step S1004, the CPU 103 determines whether the left half of the page data having the spread attribute is laid out as an even-numbered page. In this embodiment, if the binding direction is left-side binding, the left page of the set of the pages that can be spread is an even-numbered page. Therefore, if it is determined in step S1004 that the left half of the page data is laid out as an even-numbered page, the page data is laid out as a spread appropriately. Thus, if YES is determined in step S1004, the CPU 103 determines in step S1005 that the spread layout is "OK" since the allocation state of the page data having the spread attribute satisfies the condition of the spread layout.

On the other hand, if it is determined in step S1004 that the left half of the page data having the spread attribute is not laid out as an even-numbered page, the page data having the spread attribute is laid out on the front and back surfaces of one sheet. That is, the page data is not laid out as a spread appropriately. Therefore, in step S1007, the CPU 103 determines that the spread layout is "NG" since the allocation state of the page data having the spread attribute does not satisfy the condition of the spread layout. The processes in steps S1008 and S1009 after that are as described above. Note that if the book data includes a plurality of page data each having the spread attribute, the processing of FIG. 10 is executed for the plurality of page data.

FIG. 12 is a view showing an example in which the warning mark is displayed in step S1008 for left-side binding. Referring to FIG. 12, the left half of the page data having the spread attribute is laid out as page 3, that is, an odd-numbered page. That is, the page data having the spread attribute is laid out on the front and back surfaces of one sheet, and is thus inappropriate as a spread. Therefore, in this case, the processing in step S1008 displays a warning mark 1201 on pages 3 and 4 in the edit region 401.

As described above, according to this embodiment, if the spread layout fails when allocating an image to pages, the warning mark is displayed on the pages. This arrangement allows the user to readily identify pages in a file where a spread fails.

Even if the warning mark is displayed, as shown in FIG. 12, for example, the user may scroll without noticing, and undesirably press the print setting button 416. Such case will be described below.

Figure 11:
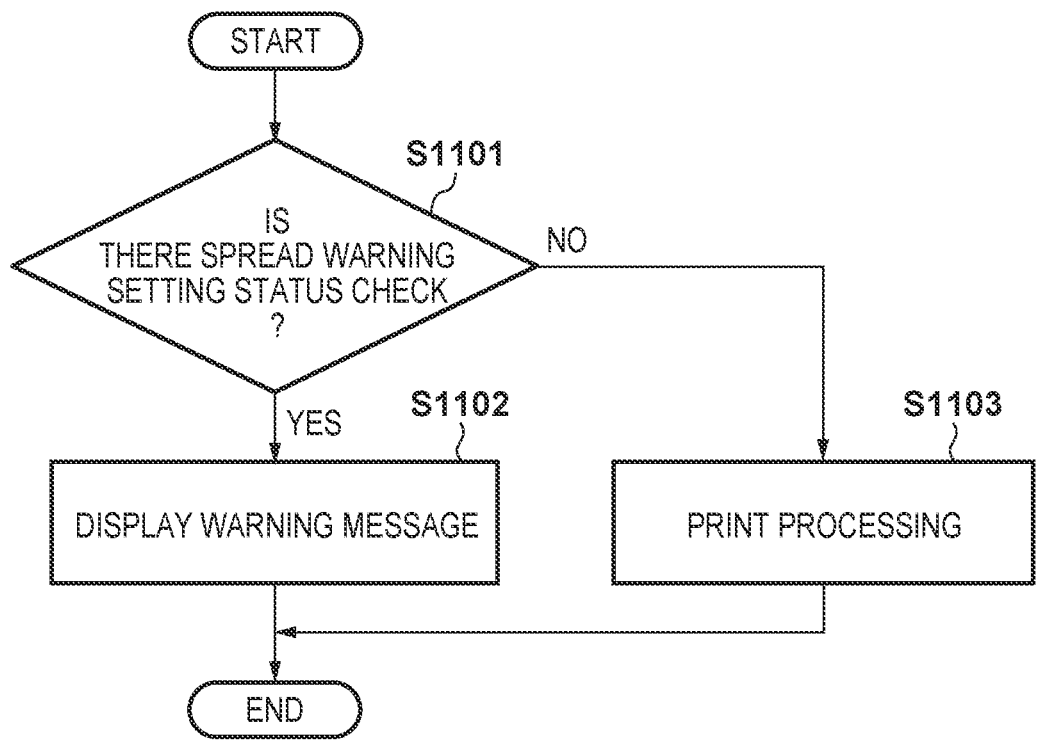
FIG. 11 is a flowchart illustrating control processing based on a spread layout determination result.

FIG. 11 is a flowchart illustrating processing executed when the print setting button is pressed in the state in which the warning mark is displayed. Each process shown in FIG. 11 is implemented when, for example, the CPU 103 loads the program stored in the ROM 104 into the RAM 105 and executes it.

In step S1101, upon detecting the pressing of the print setting button 416, the CPU 103 determines whether the status of the spread warning setting flag is ON or OFF. If it is determined that the status is ON, the CPU 103 displays a warning message on the screen in step S1102. After step S1102, the processing of FIG. 11 ends. On the other hand, if it is determined that the status of the spread warning setting flag is OFF, the CPU 103 executes normal print processing in step S1103. After step S1103, the processing of FIG. 11 ends.

Figure 13:
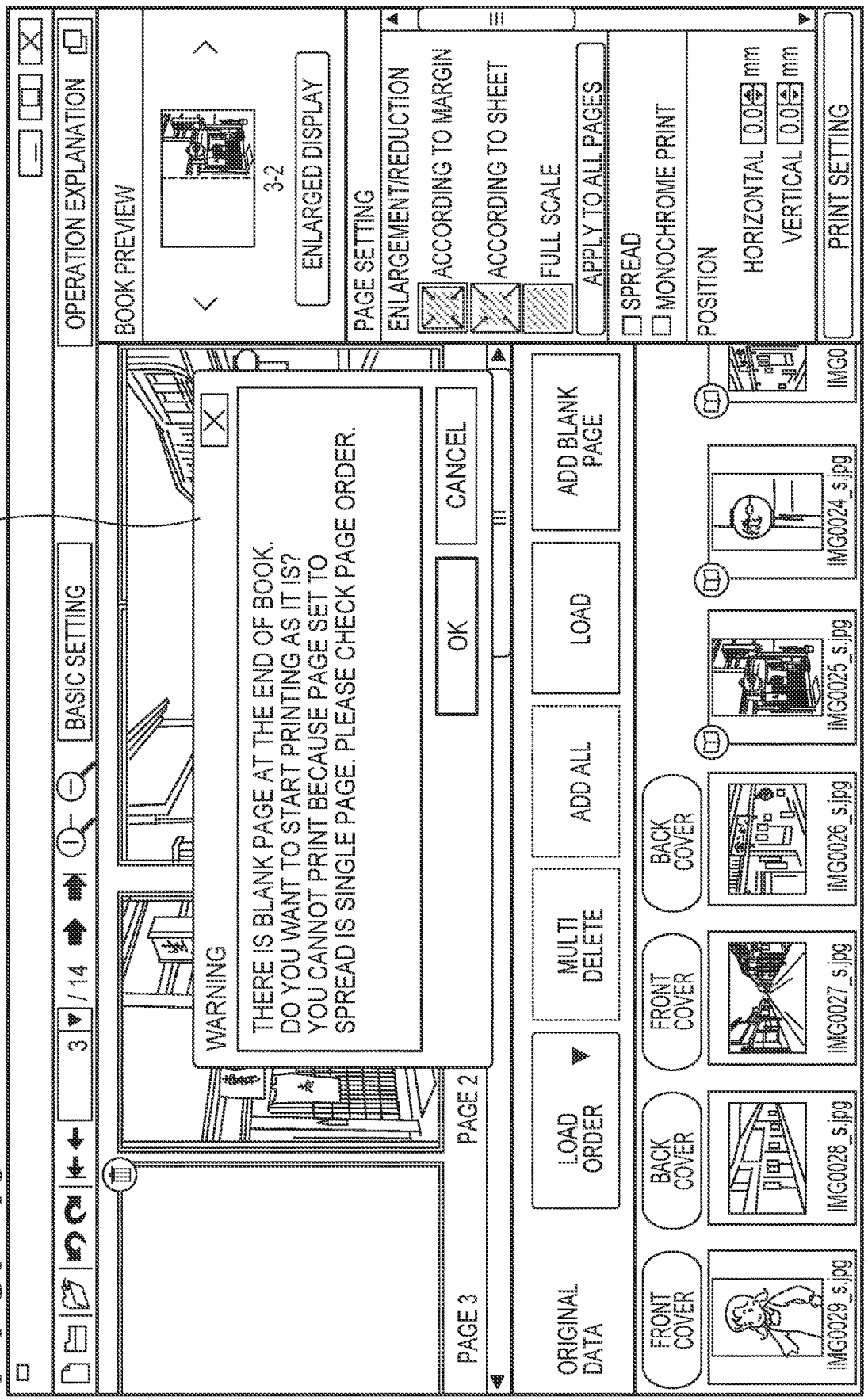
FIG. 13 is a view showing a warning screen.

FIG. 13 is a view showing an example of a screen on which the warning message is displayed in step S1102. Referring to FIG. 13, "The page set for a spread is a single page, and thus printing is impossible." is displayed as a warning message 1301, thereby making a warning notification to the user.

As described above, according to this embodiment, if the print setting button is pressed even though the warning mark is displayed, the warning message indicating that the spread fails is displayed, thus allowing the user to readily notice the failure of the spread.

As the warning message 1301 of FIG. 13, "There is a blank page at the end of the book. Do you want start printing without any change? The page set for a spread is a single page, and thus printing is impossible. Please check the page order." is displayed. If there exists a page such as a blank page that can be determined to have low relevance to another page, change of the page order may be proposed. For example, in the above case, if the user moves the blank page to a position before the page set for the spread, the failure of the spread is resolved.

Figure 14:
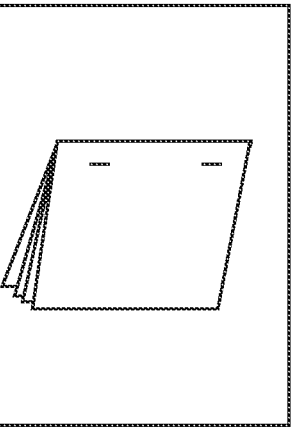
FIG. 14 is a view showing an arrangement of controlling execution of printing.

The example in which when the print setting button 416 is pressed in the state in which the warning mark is displayed, the warning message is displayed on the screen has been explained with reference to FIGS. 11 and 13. If the print setting button 416 is pressed in the state in which the status of the spread warning setting flag is ON, and the print setting screen is displayed, as shown in FIG. 14, the CPU 103 may restrict display by, for example, graying out a button 1401 for instructing the start of execution of printing so as not to be executed.

As described above, if the spread fails when allocating the page data to pages of the book, a warning that the spread fails is displayed together with the allocation state. Even if the user attempts to advance the print processing in spite of the failure of the spread, execution of printing is restricted by display of the warning message in FIG. 13 or display control of the instruction button in FIG. 14. Therefore, it is possible to make the user surely confirm that the spread fails before printing starts.

Display of the warning message indicating that the spread fails or restriction of execution of printing has been described above. Processing in which when the spread fails, printing is enabled by inserting a predetermined page to resolve the failure of the spread will be described below.

Figure 15:
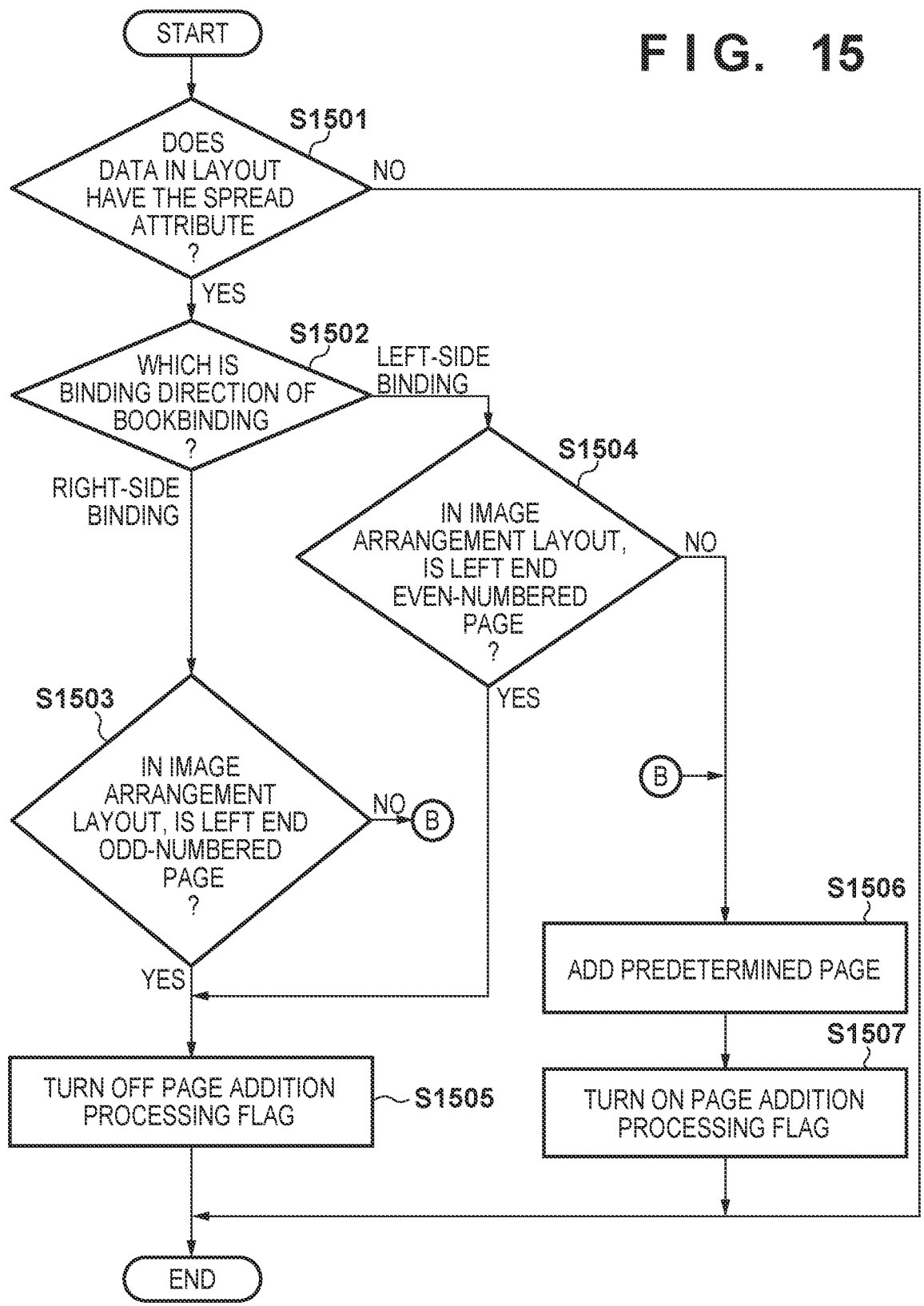
FIG. 15 is a flowchart illustrating spread layout determination processing.

FIG. 15 is a flowchart illustrating processing in which if the spread fails, printing is enabled by inserting a predetermined page. Each process shown in FIG. 15 is implemented when, for example, the CPU 103 loads the program stored in the ROM 104 into the RAM 105 and executes it. Steps S1501 to S1504 are the same as steps S1001 to S1004 of FIG. 10 and a description thereof will be omitted. A page addition processing flag is secured in the RAM 105.

If it is determined in step S1503 that the left half of the page data having the spread attribute is laid out as an odd-numbered page, the page data is laid out as a spread appropriately. Therefore, in step S1505, the CPU 103 turns off the page addition processing flag (to be described later). After step S1505, the processing of FIG. 15 ends.

On the other hand, if it is determined in step S1503 that the left half of the page data having the spread attribute is not laid out as an odd-numbered page, the page data is laid out on the front and back surfaces of one sheet, and is not laid out as a spread appropriately. Therefore, in step S1506, the CPU 103 inserts a predetermined page as a page before the page data having the spread attribute.

FIGS. 17A to 17C are views for explaining the page insertion processing in step S1506. Referring to FIGS. 17A to 17C, the page number increases from left to right. Note that gray portions at the left end in FIGS. 17A to 17C represent the front cover.

In FIG. 17A, the page data having the spread attribute is allocated to pages 4 and 5 appropriately. FIG. 17B shows a state in which after allocation in FIG. 17A, the user inserts a new page at the position of page 2. As a result of the page insertion, allocation of the page data shifts by one page. Therefore, as shown in FIG. 17B, the page data having the spread attribute is allocated to pages 5 and 6, causing a failure of a spread. In this case, in step S1506 of FIG. 15, the CPU 103 inserts a blank page as a predetermined page at the position before the page data having the spread attribute, that is, at the position of page 5 in FIG. 17C. As a result, as shown in FIG. 17C, the page data having the spread attribute is allocated to pages 6 and 7 appropriately.

In FIG. 17B, the state in which the page is inserted has been explained. However, the same applies to a case in which a page is deleted. For example, if page 2 is deleted in FIG. 17B, the page data having the spread attribute is allocated to pages 3 and 4, causing a failure of a spread, similar to the above case. In this case, the CPU 103 inserts a predetermined page at the position of preceding page 2.

The predetermined page added in step S1506 is not limited to a blank page and may be a page of another form. For example, a page on which a predetermined design, ornament, or pattern is printed may be added. In step S1507, the CPU 103 turns on the page addition processing flag. After step S1507, the processing of FIG. 15 ends.

Figure 16:
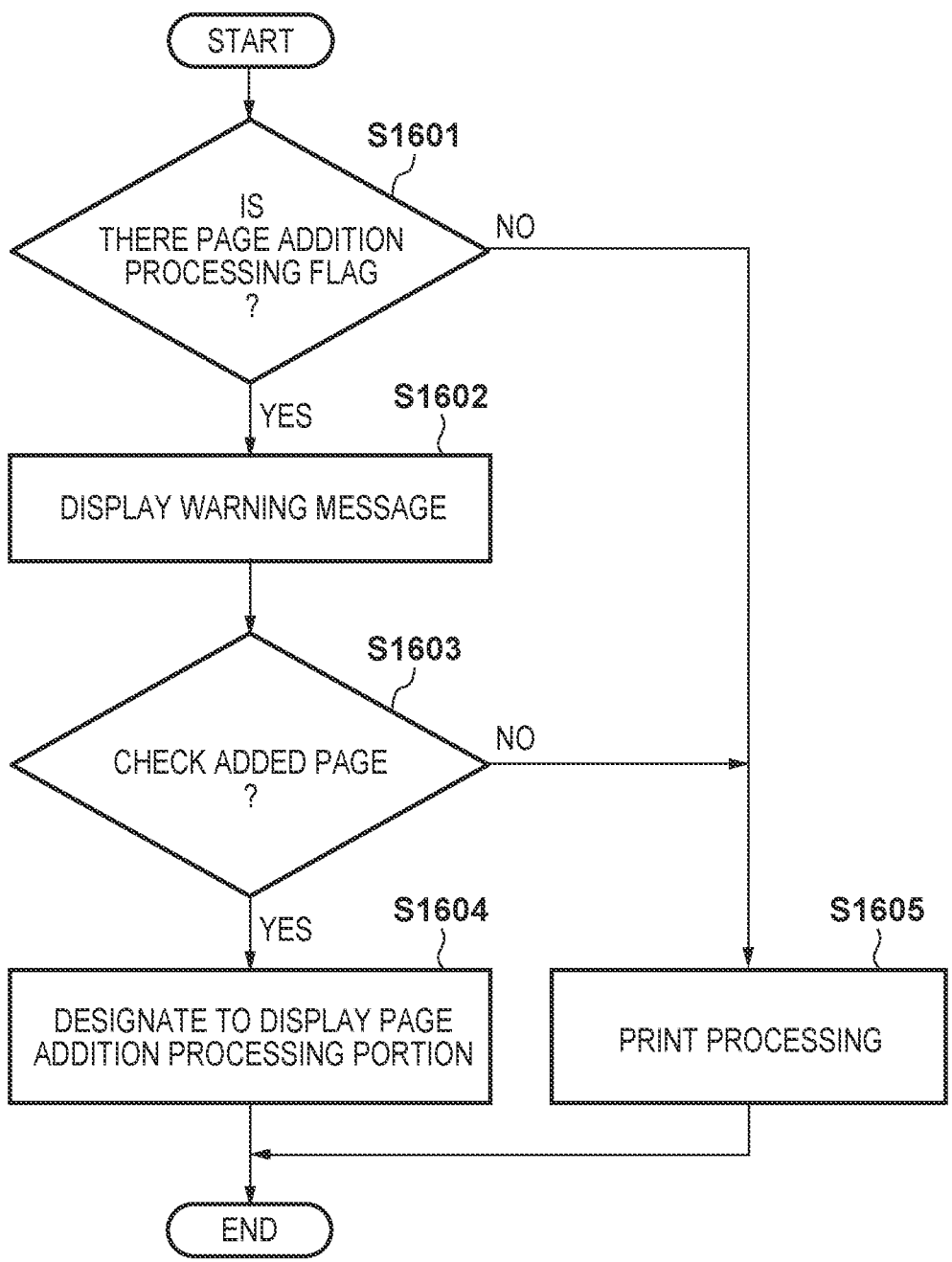
FIG. 16 is a flowchart illustrating control processing based on a spread layout determination result.

FIG. 16 is a flowchart illustrating processing after the setting of the page addition flag. Each process shown in FIG. 16 is implemented when, for example, the CPU 103 loads the program stored in the ROM 104 into the RAM 105 and executes it. The processing of FIG. 16 starts when, for example, the print setting button 416 is pressed.

In step S1601, the CPU 103 determines the status of the page addition processing flag. If it is determined that the status of the page addition processing flag is ON, the CPU 103 displays a warning message on the screen in step S1602. In step S1602, for example, a message "The page set for a spread is a single page, and thus a page is added. Do you want to check the added page?" is displayed to accept an instruction to check/not to check the page.

If, in step S1603, when an instruction to check the added page is accepted, the CPU 103 displays a portion where the page addition processing has been performed. For example, the CPU 103 displays, in the edit region 401, a portion near the page having undergone the page addition processing. At this time, a screen that can display the print setting screen successively in accordance with the user instruction, like "The portion near the added page is displayed. Do you want to display the print setting screen successively?" Furthermore, an edit screen in which the added predetermined page can be edited may be displayed. For example, the user may be able to select one of a plurality of kinds of template pages on which designs and pattern images are laid out. After step S1604, the processing of FIG. 16 ends.

On the other hand, if it is determined in step S1601 that the status of the page addition processing flag is OFF or if an instruction not to check the added page is accepted in step S1603, the CPU 103 displays the print setting screen in step S1605. Then, the user executes print processing by pressing the print button included in the print setting screen. That is, the bookbinding application 201 instructs the printer driver 202 to execute printing based on the book data (application data). After step S1605, the processing of FIG. 16 ends.

As described above, according to this embodiment, if it is determined that the spread fails, the failure of the spread is resolved by adding a predetermined page. With this arrangement, the print processing can be executed by resolving the failure of the spread without displaying the warning message, as shown in FIG. 11. Note that the example in which the predetermined page is inserted at the position of the page immediately before the original data having the spread attribute has been explained. However, if the failure of the spread is resolved by adding the predetermined page at a position before the original data having the spread attribute, the predetermined page need not be inserted at the position of the immediately preceding page.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-129466, filed Jul. 6, 2018, which is hereby incorporated by reference herein in its entirety.

What is claimed is:

1. An information processing apparatus comprising:
one or more processors; and
one or more memories storing instructions that, when executed by the one or more processors, cause the information processing apparatus to:
(1) display a preview screen including a preview image based on page data included in book data; and
(2) set a spread attribute for laying out one page data included in the book data over a plurality of pages,
wherein the displaying of the preview screen (a) displays the preview screen including the preview image and information indicating that a spread condition is not satisfied, if it is determined that a first region of page data having the spread attribute is laid out on a side of a sheet and a second region, different from the first region, of the page data having the spread attribute is laid out on the opposite side of the sheet and (b) displays the preview screen including the preview image without the information indicating that the spread condition is not satisfied, if it is determined that the first region of the page data having the spread attribute and the second region of the page data having the spread attribute are laid out on a same side of a spread page of a book.

2. The apparatus according to claim 1, wherein the instructions, when executed by the one or more processors, further cause the information processing apparatus to:
accept an instruction for print processing; and
restrict, if the instruction for the print processing is accepted in a state that the page data having the spread attribute does not satisfy the spread condition, execution of the print processing.

3. The apparatus according to claim 2, wherein the execution of the print processing is restricted by making a notification that the spread condition is not satisfied.

4. The apparatus according to claim 2, wherein if the instruction for the print processing is not a print execution start instruction acceptance of the print execution start instruction is restricted.

5. The apparatus according to claim 1, wherein the instructions, when executed by the one or more processors, further cause the information processing apparatus to:
change the number of pages at a forward position of a page allocated with the page data having the spread attribute.

6. The apparatus according to claim 5, wherein the number of pages is changed by adding a page.

7. The apparatus according to claim 1, wherein the instructions, when executed by the one or more processors, further cause the information processing apparatus to cause a printing apparatus to perform print processing based on the book data.

8. The apparatus according to claim 1, wherein the information indicating that the spread condition is not satisfied is displayed on the preview image based on the page data, having the spread attribute, that has been determined not to satisfy the spread condition.

9. The apparatus according to claim 1, wherein the side of the sheet and the opposite side of the sheet are a front surface of the sheet and a back surface of the sheet, respectively.

10. A system comprising:
an information processing apparatus; and
a printing apparatus,
wherein the information processing apparatus comprises (A) one or more processors and (B) one or more memories storing instructions that, when executed by the one or more processors, cause the information processing apparatus to (1) display a preview screen including a preview image based on page data included in book data and (2) set a spread attribute for laying out one page data included in the book data over a plurality of pages, wherein the displaying of the preview screen (a) displays the preview screen including the preview image and information indicating that a spread condition is not satisfied, if it is determined that a first region of page data having the spread attribute is laid out on a side of a sheet and a second region, different from the first region, of the page data having the spread attribute is laid out on the opposite side of the sheet and (b) displays the preview screen including the preview image without the information indicating that the spread condition is not satisfied, if it is determined that the first region of the page data having the spread attribute and the second region of the page data having the spread attribute are laid out on a same side of a spread page of a book.

11. A display method executed in an information processing apparatus, the method comprising:

displaying a preview screen including a preview image based on page data included in book data;

setting a spread attribute for laying out one page data included in the book data over a plurality of pages; and wherein the displaying (a) displays the preview screen including the preview image and information indicating that a spread condition is not satisfied, if it is determined that a first region of page data having the spread attribute is laid out on a side of a sheet and a second region, different from the first region, of the page data having the spread attribute is laid out on the opposite side of the sheet and (b) displays the preview screen including the preview image without the information indicating that the spread condition is not satisfied, if it is determined that the first region of the page data having the spread attribute and the second region of the page data having the spread attribute are laid out on a same side of a spread page of a book.

12. The method according to claim 11, further comprising:

accepting an instruction for print processing; and restricting, if the instruction for the print processing is accepted in a state that the page data having the spread attribute does not satisfy the spread condition, execution of the print processing.

13. The method according to claim 12, wherein the execution of the print processing is restricted by making a notification that the spread condition is not satisfied.

14. The method according to claim 12, wherein if the instruction for the print processing is not a print execution start instruction, acceptance of the print execution start instruction is restricted.

15. The method according to claim 11, further comprising changing the number of pages at a forward position of a page allocated with the page data having the spread attribute.

16. The method according to claim 15, wherein the number of pages is changed by adding a page.

17. The method according to claim 11, wherein print processing based on the book data is executed in a printing apparatus.

18. The method according to claim 11, wherein the information indicating that the spread condition is not satisfied is displayed on the preview image based on the page data, having the spread attribute, that has been determined not to satisfy the spread condition.

19. The method according to claim 11, wherein the side of the sheet and the opposite side of the sheet are a front surface of the sheet and a back surface of the sheet, respectively.

20. A non-transitory computer-readable storage medium storing a program for causing a computer to:

display a preview screen including a preview image based on page data included in book data; and set a spread attribute for laying out one page data included in the book data over a plurality of pages, wherein the displaying a preview screen (a) displays the preview screen including the preview image and information indicating that a spread condition is not satisfied, if it is determined that a first region of page data having the spread attribute is laid out on a side of a sheet and a second region, different from the first region, of the page data having the spread attribute is laid out on the opposite side of the sheet and (b) displays the preview screen including the preview image without the information indicating that the spread condition is not satisfied, if it is determined that the first region of the page data having the spread attribute and the second region of the page data having the spread attribute are laid out on a same side of a spread page of a book.

* * * * *